(12) United States Patent
Maruyama et al.

(10) Patent No.: US 11,876,608 B2
(45) Date of Patent: Jan. 16, 2024

(54) REDUNDANT CONTROL SYSTEM

(71) Applicant: Hitachi, Ltd., Tokyo (JP)

(72) Inventors: Tatsuya Maruyama, Santa Clara, CA (US); Shoji Yunoki, Santa Clara, CA (US); Hidenori Omiya, Ibaraki-ken (JP); Yusaku Otsuka, Ibaraki-ken (JP); Iori Kobayashi, Ibaraki-ken (JP); Toshiki Shimizu, Ibaraki-ken (JP)

(73) Assignee: HITACHI, LTD, Tokyo (JP)

( * ) Notice: Subject to any disclaimer, the term of this patent is extended or adjusted under 35 U.S.C. 154(b) by 303 days.

(21) Appl. No.: 17/182,064

(22) Filed: Feb. 22, 2021

(65) Prior Publication Data
US 2022/0271854 A1 Aug. 25, 2022

(51) Int. Cl.
*H04J 3/06* (2006.01)
*H04L 67/125* (2022.01)

(52) U.S. Cl.
CPC .......... *H04J 3/0661* (2013.01); *H04L 67/125* (2013.01)

(58) Field of Classification Search
CPC ............... H04J 3/0661; H04L 67/125; H04L 67/1095; H04L 67/1097; H04W 4/70
See application file for complete search history.

(56) References Cited

U.S. PATENT DOCUMENTS

| | | | |
|---|---|---|---|
| 6,970,961 B1 | 11/2005 | Heitkamp et al. | |
| 8,615,313 B2 * | 12/2013 | Wilson | G06F 9/542 709/224 |
| 11,070,348 B1 * | 7/2021 | Huang | H04W 40/02 |
| 2008/0074996 A1 * | 3/2008 | Fourcand | H04L 1/0086 370/464 |
| 2009/0310485 A1 * | 12/2009 | Averi | H04L 43/106 370/232 |
| 2014/0098760 A1 * | 4/2014 | Park | H04L 5/0073 370/329 |

(Continued)

FOREIGN PATENT DOCUMENTS

| | | | | |
|---|---|---|---|---|
| CN | 112288318 A | * | 1/2021 | |
| JP | 7122812 B2 | * | 8/2022 | ........... A61B 17/068 |
| WO | WO-2019167415 A1 | * | 9/2019 | |

OTHER PUBLICATIONS

Hannuksela et al. "Synchronized Audio Redundancy Coding for Improved Error Resilience in Streaming over DVB-H", pp. 1-4 (Year: 2010).*

(Continued)

*Primary Examiner* — Eyob Hagos
(74) *Attorney, Agent, or Firm* — Procopio, Cory, Hargreaves & Savitch LLP

(57) ABSTRACT

Example implementations described herein are directed to a plurality of control functions connected via a communication network and synchronized, where the control functions communicate packets including control data, the function identifier for the function associated with the control data, and time identifier such as a time identifier representing the synchronized time associated with the control data. Example implementations determine control data associated with the function identifier and the time identifier from one or more packets that has the same function identifier and time identifier, received in the certain time period based on the time specified by the time identifier.

15 Claims, 20 Drawing Sheets

(56) References Cited

U.S. PATENT DOCUMENTS

| | | | | |
|---|---|---|---|---|
| 2014/0169182 | A1* | 6/2014 | Olgaard | H04W 24/00 |
| | | | | 370/245 |
| 2015/0172091 | A1* | 6/2015 | Che | H04L 45/742 |
| | | | | 370/392 |
| 2015/0319004 | A1* | 11/2015 | Kwan | H04N 21/2404 |
| | | | | 370/252 |
| 2016/0360497 | A1* | 12/2016 | Maruyama | H04N 21/6437 |
| 2018/0026900 | A1* | 1/2018 | Saavedra | H04L 47/56 |
| | | | | 370/235 |
| 2018/0152511 | A1* | 5/2018 | Wilson | H04L 65/61 |
| 2019/0150106 | A1* | 5/2019 | Teruhi | H04W 56/001 |
| | | | | 370/338 |
| 2020/0412469 | A1* | 12/2020 | He | H04J 3/0602 |
| 2021/0069550 | A1* | 3/2021 | Clark | A63B 71/0622 |
| 2021/0377331 | A1* | 12/2021 | Lapointe | H04L 65/65 |

OTHER PUBLICATIONS

SMPTE "Seamless Protection Switching of RTP Datagrams" pp. 1-10 (Year: 2019).*

"Frame Replication and Elimination for Reliability" IEEE Std 802.1CB™—2017, New York, NY in 102 pages.

* cited by examiner

| Sending function | Receiving function | Function identifier | Start time [μS] | Period | Note |
|---|---|---|---|---|---|
| Sensor function in I/O control device 123a | Controller function of control function 1 | 1 | 100,000,000 | 100 μS | deadline +50μS type: sensor |
| Controller function in I/O control device 123c | Actuator function in I/O control device 123b | 2 | 50,000,000 | 100 μS | type: control |
| Sensor function in I/O control device 123c | Controller function of control function 2 | 3 | 50,000,000 | 1 ms | deadline +100μS type: sensor |
| Controller function of control function 2 | Actuator function in I/O control device 123c | 4 | 50,001,000 | 1 ms | type: control |
| Sensor function in I/O control device 123d | Controller function of control function 3 | 5 | 80,000,000 | 5 ms | deadline +2ms type: sensor |
| Controller function of control function 3 | Actuator function in I/O control device 123d | 6 | 80,005,000 | 5 ms | type: control |

| Header | Function identifier (170) | Time identifier (171) | Data (172) |
|---|---|---|---|

FIG. 14(b)

| Header | 1 | 100,000,000 | Sensor value t0 |
|---|---|---|---|

FIG. 14(c)

| Header | 2 | 100,000,100 | Control command |
|---|---|---|---|

FIG. 15(a)
| Identifier | Time |
|---|---|
| 0 | 100,000,000 |
| 1 | 100,001,000 |
| 2 | 100,005,000 |
| 3 | 100,008,000 |
| 4 | 100,010,000 |
| ... | ... |
FIG. 15(b)
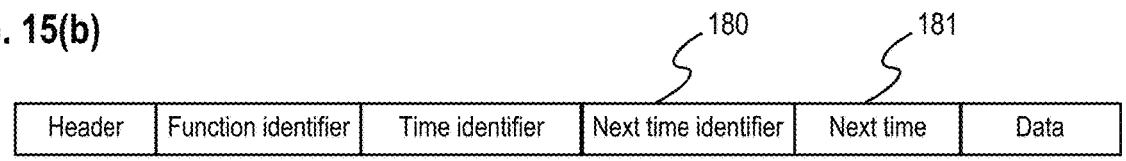
| Header | Function identifier | Time identifier | Next time identifier | Next time | Data |
180, 181
FIG. 15(c)
| Header | 1 | 0 | 1 | 100,001,000 | Data |
182, 183

FIG. 16(a)

| DST MAC | SRC MAC | 0x892F | Path ID | Frame size | Seq. No. | Eth. Type | Function identifier | Data |
|---|---|---|---|---|---|---|---|---|
| | | 2 byte | 4 byte | 12 byte | 2 byte | | | |

190 → Seq. No.
191 → Function identifier

FIG. 16(b)

| DST MAC | SRC MAC | Eth. Type | Function identifier | Data | Seq. No. | LAN ID | Frame size | 0x88FB |
|---|---|---|---|---|---|---|---|---|
| | | | | | 2 byte | 4 byte | 12 byte | 2 byte |

191 → Function identifier
190 → Seq. No.

FIG. 16(c)

| DST MAC | SRC MAC | 0xF1C1 | Reserved | Seq. No. | Eth. Type | Function identifier | Data |
|---|---|---|---|---|---|---|---|
| | | 2 byte | 2 byte | 2 byte | | | |

190 → Seq. No.
191 → Function identifier

REDUNDANT CONTROL SYSTEM

BACKGROUND

Field

The present disclosure is generally related to control systems, and more specifically, to redundant control systems for systems such as factory or process automation.

Related Art

Control systems for supporting social infrastructure are constituted by sensors, controllers, and actuators. The state of the physical world is sensed by the sensor and is input to the controller, whereupon the controller calculates the control command value for controlling the actuator. The actuator operates on the physical world based on the command value calculated by the controller. For example, repeating a series of processes periodically performs the desired control.

Examples of such control systems can include factory automation (FA) in factories, process automation (PA) in chemical plants and others, power system control, power generation plant, water plant system, steel control system, and so on.

In large-scale control systems, a plurality of sensors, controllers, actuators are connected via a network. Such networks have been progressed as a control network, to satisfy time constraints requirements of the control system (e.g., the worst delay), cost, reliability, and application-specific requirements.

One of the main requirements of the control system is high reliability. This means that the control system can be tolerant to failures occurred in the elements constituting the control system.

One of the methods to improve reliability is the redundancy of the target element. The methods are classified into standby redundancy and continuous redundancy in accordance with the timing of enabling the redundancy. Standby redundancy is a method of switching to a redundant system when main system failures, while continuous redundancy is a method in which the main system and the redundant system is always active.

In an example involving controllers in a control system, standby redundancy involves preparing two controllers, wherein the redundant controller becomes active at the time the main controller fails. The redundant controller substitute receiving sensor information from the sensors and calculation of control commands to actuators. On the other hand, both the main controller and the redundant controller are active, and both receive sensor information from sensors in continuous redundancy. Both controllers calculate control commands and transmit the commands to the actuators. An actuator executes the control command received earlier based on, for example, first-come priority rules.

Through standby redundancy implementations, such as N+1 redundancy, it is possible to increase the reliability at low cost. However, abnormality detection with the timeout method and switches to the redundant system cause nonzero dead time. Such implementations may lower availability of the control system. In contrast, continuous redundancy does not cause such dead time, but requires double the number of elements, which results in high cost. Further, both redundant methods must satisfy the time constraints imposed on the control system.

SUMMARY

To address the issues in the related art, example implementations involve a plurality of control functions connected via a communication network, synchronized, where the control functions communicates packets including control data, function identifier for the function associated with the control data, and time identifier representing the synchronized time associated with the control data, and determines control data associated with the function identifier and the time identifier from one or more packets that has the same function identifier and time identifier, received in the certain time period based on the time specified by the time identifier.

Aspects of the present disclosure can involve multiplexing the control functions establishing different control systems into one device as the form of a software container or software program. Continuous redundancy is enabled by setting up a plurality of such devices and activating the control functions in each device.

Aspects of the present disclosure can involve reservation about the computer resources that runs the control function and network resources between the control functions for the specified period. The reservation ensures the worst communication delay between the control functions.

Aspects of the present disclosure can involve making communication path redundancy between the control function at the transmission side and at the receiving side.

Aspects of the present disclosure can involve a storage device that stores the packet or the context data of the control function, and outputs the stored information in response to a request.

Aspects of the present disclosure can involve synchronizing the context of the control function with another control function by using one or more of the context data obtained from the storage device, the packet information obtained from the storage device, and/or packets communicated on the network.

Aspects of the present disclosure can involve deployment of the destination control function from a device to another device in response to the change in the connection position of the communication network for the control function.

Aspects of the present disclosure can involve changing communication path and/or communication path redundancy to the destination control function in response to the change in the connection position of the communication network for the control function.

Further, aspects of the present disclosure can involve a time synchronized network scheme which receives redundant data packets with the same time identifier, compares the redundant packets received in the certain time period based on the current time, selects one of the redundant packets, and processes the selected one of the redundant packets.

Aspects of the present disclosure involve a method to manage data packets from one or more time synchronized apparatuses through a network scheme, the method involving receiving the data packets from the one or more time synchronized apparatuses time synchronized each of the data packets having a time identifier; selecting ones of the data packets received within a certain time period based on a current time; selecting packets having a same time identifier and function identifier from the selected ones of the data packets; and processing the selected packets having the same time identifier and the function identifier to provide output to a controller application of the one or more time synchronized apparatuses.

Aspects of the present disclosure involve a system to manage data packets from one or more time synchronized apparatuses through a network scheme, the system involving means for receiving the data packets from the one or more time synchronized apparatuses time synchronized each of the data packets having a time identifier; means for selecting ones of the data packets received within a certain time period based on a current time; means for selecting packets having a same time identifier and function identifier from the selected ones of the data packets; and means for processing the selected packets having the same time identifier and the function identifier to provide output to a controller application of the one or more time synchronized apparatuses.

Aspects of the present disclosure involve a computer program, storing instructions to manage data packets from one or more time synchronized apparatuses through a network scheme, the computer program involving instructions including receiving the data packets from the one or more time synchronized apparatuses time synchronized each of the data packets having a time identifier; selecting ones of the data packets received within a certain time period based on a current time; selecting packets having a same time identifier and function identifier from the selected ones of the data packets; and processing the selected packets having the same time identifier and the function identifier to provide output to a controller application of the one or more time synchronized apparatuses. The computer program may be stored on a non-transitory computer readable medium and executed by one or more processors.

Aspects of the present disclosure involve a computer device configured to manage data packets from one or more time synchronized apparatuses through a network scheme, the computer device involving a processor, configured to receive the data packets from the one or more time synchronized apparatuses time synchronized each of the data packets having a time identifier; select ones of the data packets received within a certain time period based on a current time; select packets having a same time identifier and function identifier from the selected ones of the data packets; and process the selected packets having the same time identifier and the function identifier to provide output to a controller application of the one or more time synchronized apparatuses.

BRIEF DESCRIPTION OF DRAWINGS

FIG. 12 illustrates an example definition of a function identifier, in accordance with an example implementation.

FIGS. 14($a$) to 14($c$) illustrate example packets, in accordance with an example implementation.

FIGS. 15($a$) to 15($c$) illustrate scheduling aspects, in accordance with an example implementation.

FIGS. 16($a$) to 16($c$) illustrate the packet format of HSR, PRP defined in IEC 62439-3, and IEEE802.1CB, respectively, in accordance with an example implementation.

DETAILED DESCRIPTION

Figure 1:
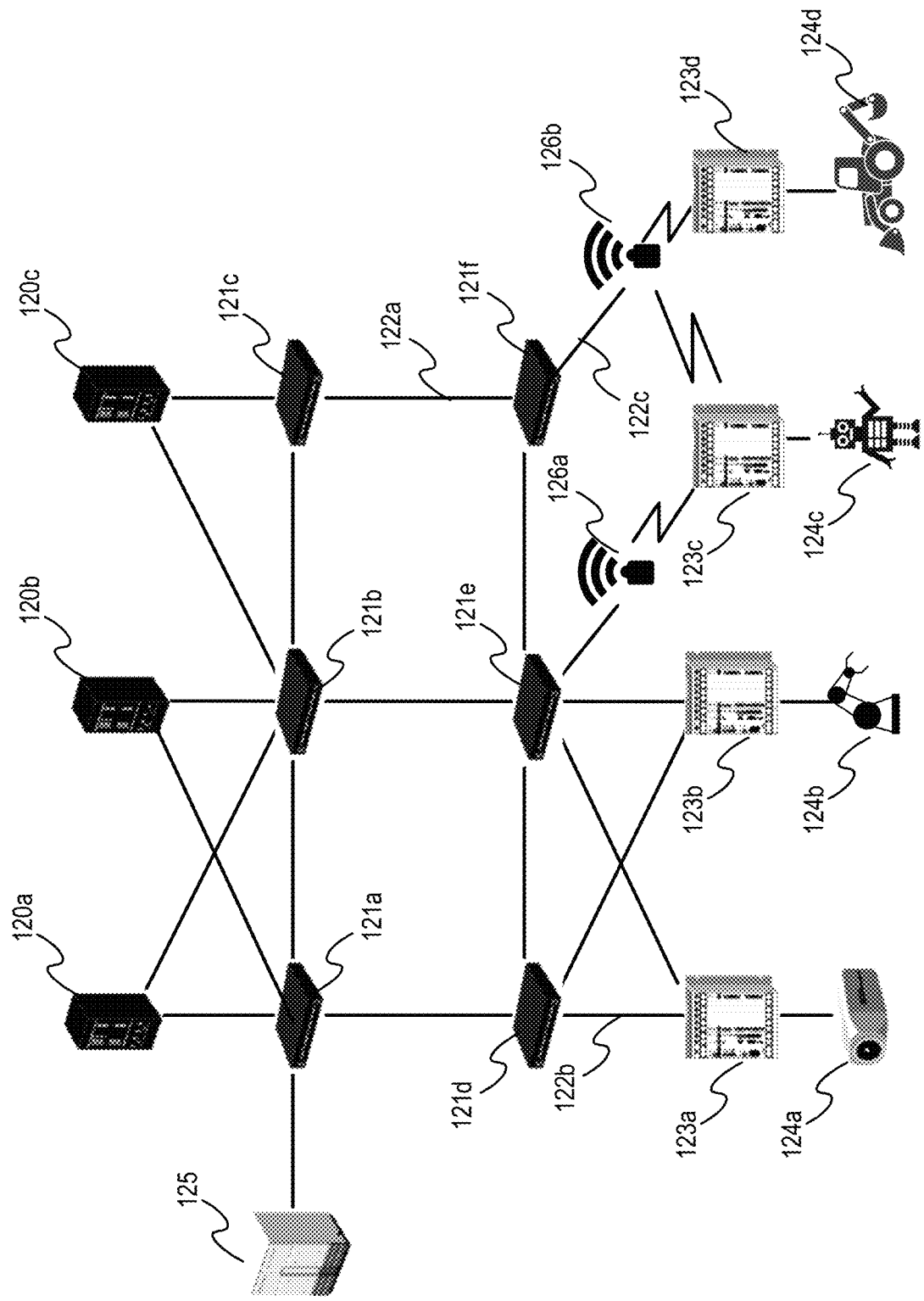
FIG. 1 illustrates an example configuration of the control system in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example configuration of the control system in accordance with an example implementation. Control devices 120$a$-120$c$, via network relay devices 121$a$-121$f$ and control network 122, connects and communicates to the input and output (I/O) control devices 123$a$ to 123$d$.

Control device 120$a$-120$c$ performs the transmission of the control command values for controlling controlled devices 124$a$-124$d$, the acquisition of measurement values and sensor information of the controlled devices 124$a$-124$d$ such as sensors or actuators, and various settings by transmitting and receiving communication packets with I/O control devices 123$a$-123$d$.

Control device 120$a$-120$c$ can be implemented in the form of a central control unit in a distributed control system (DCS) and protection relays of a power system, which may exchange sampling data, control commands, and state signals in a control system. The data in the same control system can be integrated in a packet.

Control device 120*a*-120*c* may support software virtualization technology or software container technology, then applications or Operating System (OS) may be managed as a container by the virtualization.

Depending on the desired implementation, the physical implementation of control device 120*a*-120*c* can involve a dedicated controller, an industrial Personal Computer (PC), a control computer, a DCS controller, Multi-access Edge Computing (MEC), computer cloud, a server computer, a SCADA (Supervisory Control and Data Acquisition) server, a PLC (programmable logic controller), an IED (intelligent electronic device), a protection relay, and so on.

Network relay device 121*a*-121*f* is a relay device in the control network 122. Packets communicated among the control devices 120*a*-120*c*, the I/O control devices 123*a*-123*d* and the network relay devices 121*a*-121*f* are routed and transferred.

Depending on the desired implementation, the physical implementation of the network relay device 121*a*-121*f* can be in the form of a Time Sensitive Network (TSN)-compatible switch, a network switch including a L2 switch or a L3 switch, Software Defined Network (SDN)-compatible device, Network Function Virtualization (NFV)-compatible device, a bridge, a router, an IEEE 1588 TC (Transparent Clock), BC (Boundary Clock), an OpenFlow switch, a RedBox and a QuadBox defined by IEC 62439-3, an optical switch, an optical oscillator, and other various network relay apparatuses.

Network 122 is a network for connecting the control devices 120*a*-120*c*, the network relay devices 121*a*-121*f*, and the I/O control devices 123*a*-123*d*. The physical implementation of the control network 122 can be IEEE 802.3 (Ethernet), IEC61784, IEC61784-2 Communication Profile Family 12 (hereinafter, EtherCAT (registered trademark)), various industrial networks including the control network defined in IEC61158, IEEE communication standards related to TSN, wireless network such as core network of 5G, 4G, and 6G, DNP (Distributed Network Protocol) 3, IEC 61970, HSR (High availability Seamless Redundancy) and PRP (Parallel Redundancy Protocol) in IEC62439-3, ring network, IEEE 802.17 RPR, CAN (Controller Area Network: Registered trademark), DeviceNet, RS-232C, RS-422, RS-485, ZigBee (registered trademark), Bluetooth (registered trademark), IEEE 802.15, IEEE 802.1, mobile communications, ECHONET Lite (registered trademark), OpenADR (registered trademark), various wireless communication such as Wifi and 5G, and industrial wireless network.

In addition, IEC61850, OPC UA (Unified Architecture), DDS (Data Distribution Service), IEC 61850-7-420, IEC 60870-5-104 are examples of the upper layer protocol. Alternatively, the above-mentioned protocols may be layered. For example, the contents of the data are in the TSN packet is exemplified to apply the OPC UA standard.

I/O control device 123*a*-123*d* is connected to controlled device 124*a*-124*d* such as sensors and actuators, and control and configure them in accordance with the control command received from the control device 120*a*-120*c* via the network 122. Further, it obtains the state and information of the controlled device 124*a*-124*d* and transmits them to the control device 120*a*-120*c* via the network 122.

I/O control device 123*a*-123*d* can be configured to only input information as a sensor, to only output as an actuator, or may combine both input/output functions in accordance with the desired implementation.

Depending on the desired implementation, the physical implementation of I/O control device 123*a*-123*d* can be in the form of a dedicated controller, an industrial PC, a control computer, a DCS Controller, a SCADA device, a PLC, a device equipped with wireless communication interface such as smartphone and wireless communication device, an IED, a MU (Merging Unit), a protection relay, and so on.

Controlled device 124*a*-124*d* is a device that is controlled by the I/O control device 123*a*-123*d*. Examples of controlled device 124*a*-124*d* can involve an industrial robot such as a mobile robot, humanoid, and a robotic arm, Automated Guided Vehicle (AGV), autonomous mobile object, remote-controlled mobile object, a chip mounter, a machine tools table, processing equipment, a machine tool, semiconductor manufacturing equipment, a motor or an inverter in a manufacturing device, power equipment such as a circuit breaker and a disconnector, various sensor (encoders, temperature sensors, pressure sensors, etc.), and so on in accordance with the desired implementation.

Control communication storage device 125 receives a control packet to be communicated between a control device 120 and an I/O control device 123 via the network 122 and stores them. It also provides stored information upon request.

Examples of control communication storage device 125 can involve a file server or storage server, such as Network Attached Storage (NAS), computer cloud, and dedicated communication device, and so on.

Access point 126 is a base station in wireless communication and communicates with mobile object and the I/O control device 123*c* and 123*d* without a wired connection via the wireless network 122*c*. In addition, it communicates with control device 120 and control communication storage device 125 via the network 122*a*. Examples of access point 126 can involve a base station of 4G, 5G, 6G, industrial wireless communication such as WirelessHART and ISA100, and so on.

Incidentally, the number of the network relay devices 121*a*-121*f* in FIG. 1 can be any number in accordance with the desired implementation, and the number of communication paths between a control device 120*a*-120*c* and an I/O control device 123*a*-123*d* can be different.

Further, the control device 120*a*-120*c* and the I/O control device 123*a*-123*d* are distinguished, but a communication device may involve both roles in one device depending on the desired implementation.

Further, there may be one or more control devices 120*a*-120*c* in the control system.

Examples of the control system shown in FIG. 1 can include a distributed control system (DCS) for FA (Factory Automation) and PA (Process Automation), remote control system using wireless communication, monitoring and protection control systems in power systems, industrial equipment, semiconductor manufacturing equipment, in-vehicle systems, control systems in construction machinery and railway vehicles, railway ground signal system, control systems in an aircraft, and so on. Alternatively, an Internet of Things (IoT) system to improve the performance of the control system by using artificial intelligence applied for the information collected via the network 122 on the control device 120*a*-120*c* or a cloud or a computer is also applicable.

Figure 2:
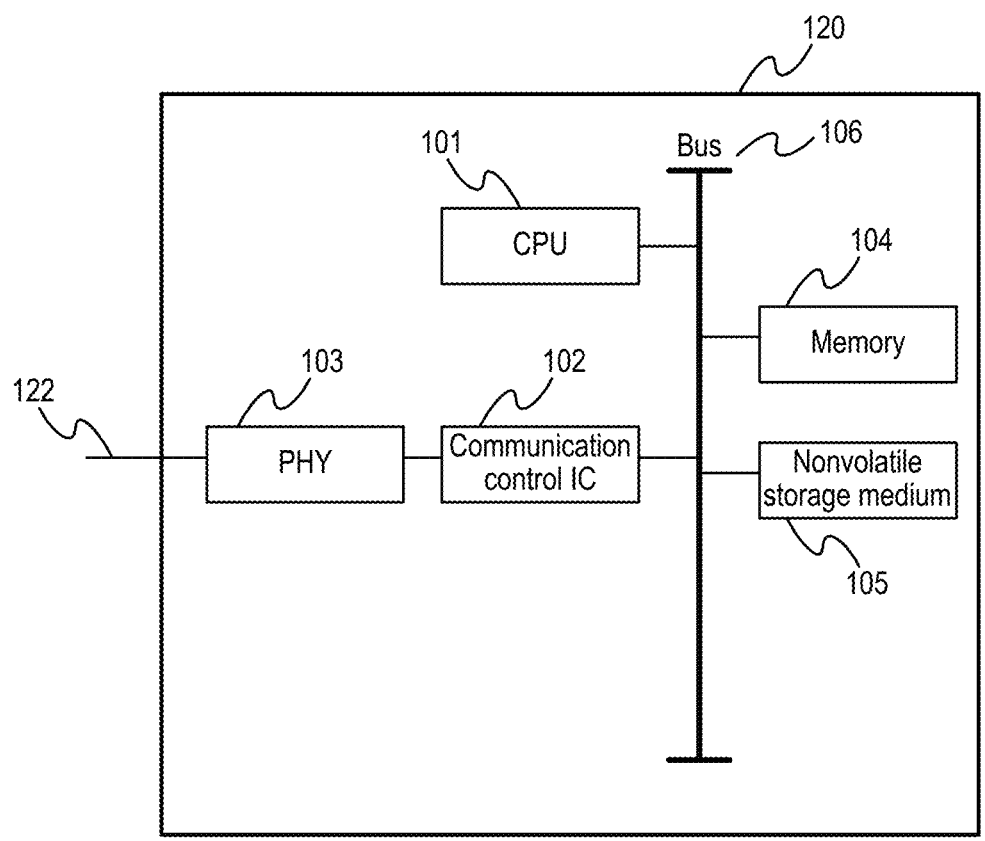
FIG. 2 illustrates the hardware structure of the control device and the control communication storage device, in accordance with an example implementation.

FIG. 2 illustrates the hardware structure of the control device 120 and the control communication storage device 125, in accordance with an example implementation. Central Processing Unit (CPU) 101 transfers programs from the nonvolatile storage medium 105 to the memory 104 and executes them. The operating system (hereinafter referred to as OS) and application programs operating on the OS are exemplified as the execution programs. Programs operating on the CPU 101 operate settings of the communication control integrated circuit (IC) 102 and obtain the state information.

Communication control Integrated Circuit (IC) 102 receives transmission requests, transmission data from software running on the CPU 101, and transmits to the network 122 using physical layer (PHY) 103. Also, the communication control IC 102 transfers the data received from the network 122 to the CPU 101, the memory 104, and the nonvolatile storage medium 105 via the bus 106.

Communication control IC 102 also provides a function for running a time synchronization protocol using a network. That is, the communication control IC 102 controls the timestamping at the time of transmission and reception of the time synchronization packets, setting the correction value to the synchronization packet, and the addition of the residential time to the correction value.

Such time synchronization protocols include IEEE1588, IEEE802. 1AS, NTP, SNTP, and so on, in accordance with the desired implementation. As a correction value, IEEE1588 Correction Field (CF) is an applicable example. In addition, another example can involve supporting timestamp function of transmission and receiving in physical layer to synchronize accurately compared to time synchronization protocol executed by software processing mainly.

In addition, another example can involve supporting a time management function based on the synchronized time. Such time management functions include the interruption at the specified time, generation of alarm signals, interruption at a predetermined period, and providing synchronized time to other function units and devices.

An implementation of the communication control IC 102 is an FPGA (Field Programmable Gate Array), a CPLD (Complex Programmable Logic Device), an ASIC (Application Specific Integrated Circuit), an IC such as gate arrays, and so on in accordance with the desired implementation. Alternatively, it may be constituted by integrating with the CPU 101. The communication control IC 102 may be an IEEE 802.3 communication device including MAC layer and/or PHY layer. In this case, the implementation example of the communication control IC 102 is an IEEE 802.3 MAC (Media Access Control) chip, a PHY (physical layer) chip, and a MAC/PHY composite chip. Incidentally, the communication control IC 102 may be included in CPU 101 or a chip set that controls the information path inside a computer. Further, in the structure of FIG. 2, only the single communication control IC 102 is shown, but the number of communication control IC 102 may be a plurality.

PHY 103 is a transceiver IC that implements the communication function with the network 122. IEEE 802.3 as a communication standard provided by PHY 103 is an example of the communication function. In the structure of FIG. 2, since the PHY 103 and the communication control IC 102 is connected, IEEE 802.3 Media Access Control (MAC) processing is included in the communication control IC 102. However, the effect of the present example implementation remains in the structure for placing a MAC function IC between the communication control IC 102 and PHY 103, and in the structure for connecting the communication control IC 102 and the communication IC combining MAC function IC and PHY 103. Incidentally, PHY 103 may be included in the communication control IC 102. Further, in the structure of FIG. 2, only one PHY 103 is shown, but the number of PHY 103 may be a plurality depending on the desired implementation.

The memory 104 is a temporary storage area for CPU 101 to operate; it stores OS and application programs transferred from the nonvolatile storage medium 105.

Nonvolatile storage medium 105 is a storage for information and is used to store programs for operating the CPU 101 such as OS, applications, and device drivers, etc. and execution results of the programs. Examples of the nonvolatile storage medium 105 can involve hard disk drive (HDD), solid state drive (SSD), and/or flash memory. Further, nonvolatile storage medium 105 can be implemented as an external removable storage medium such as floppy disk (FD), CD, DVD, Blu-Ray™, USB memory, compact flash, and so on.

Bus 106 connects the CPU 101, the communication control IC 102, the memory 104, the nonvolatile storage medium 105. Examples of bus 106 can include a Peripheral Component Interconnect (PCI) Bus, Industry Standard Architecture (ISA) bus, PCI Express bus, system bus, memory bus, and so on.

Figure 3:
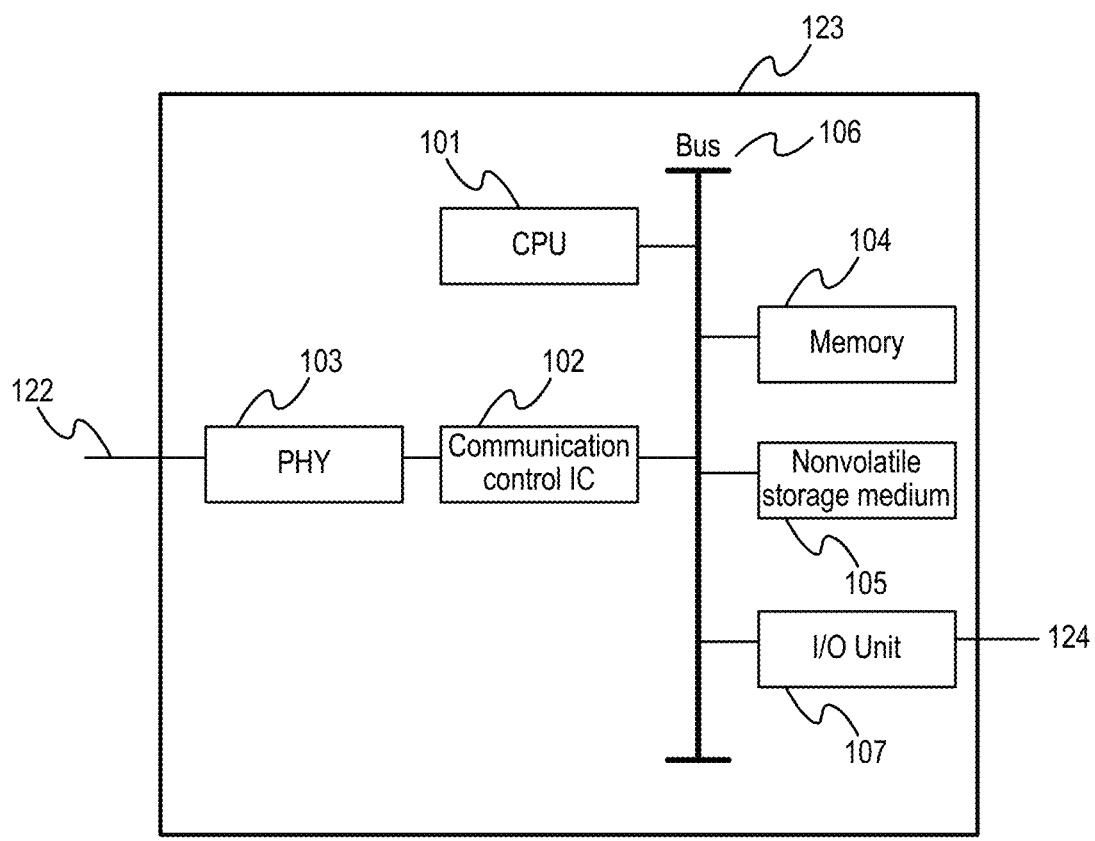
FIG. 3 illustrates the hardware structure of the I/O control device, in accordance with an example implementation.

FIG. 3 illustrates the hardware structure of the I/O control device 123, in accordance with an example implementation. I/O unit 107 is an input-output interface for controlling the controlled device 124 or acquiring the information of the controlled device 124. Examples of I/O unit 107 can involve digital input and output interfaces and analog I/O IC. Although the signal line from the I/O unit 107 is shown in singular, there can be a plurality of lines depending on the controlled device 124.

Figure 4:
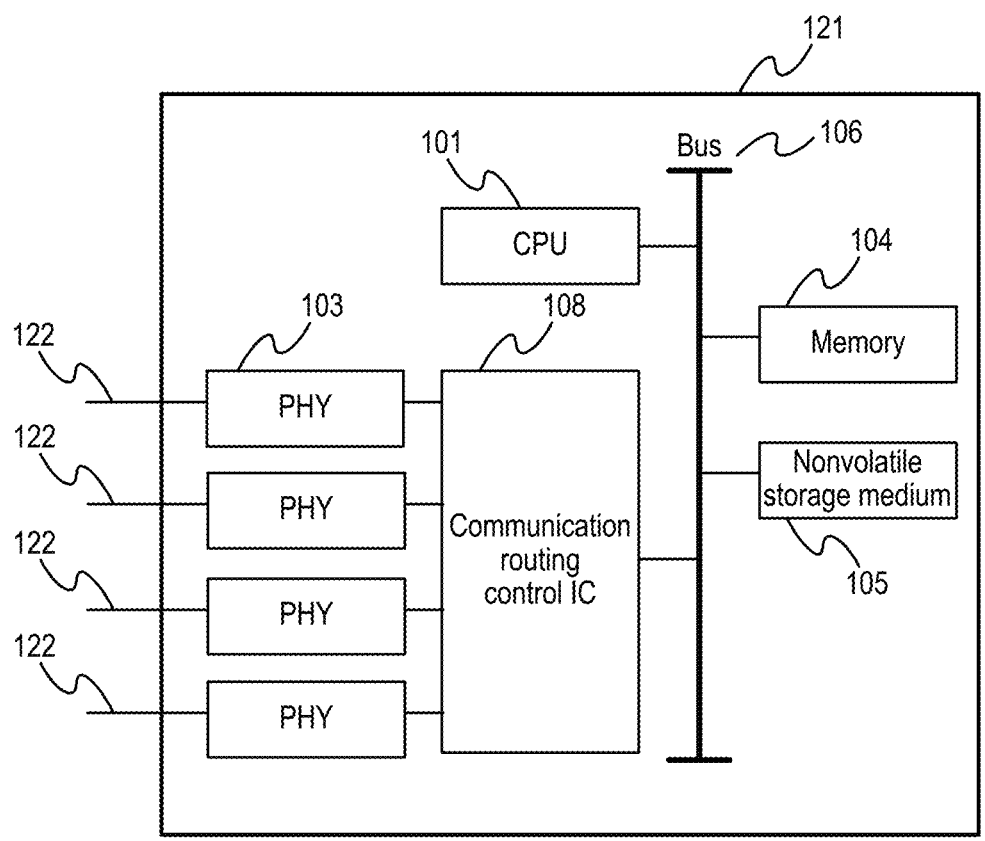
FIG. 4 illustrates the hardware structure of the network relay device, in accordance with an example implementation.

FIG. 4 illustrates the hardware structure of the network relay device, in accordance with an example implementation. Communication routing control IC 108 connects one or more PHY 103 and the bus 106, and executes routing control of received packets. Communication routing control IC 108 may connect to the bus 106 and communicate with the communication control IC 102 via the bus 106.

Examples of the communication routing control IC 108 can involve FPGA, CPLD, ASIC, IC such as a gate array, and so on. Incidentally, the communication routing control IC 108 may be included in the CPU 101 or the chip set that controls the information path inside the computer, depending on the desired implementation. Further, any number of PHY 103 can be used to facilitate the desired implementation.

Figure 5:
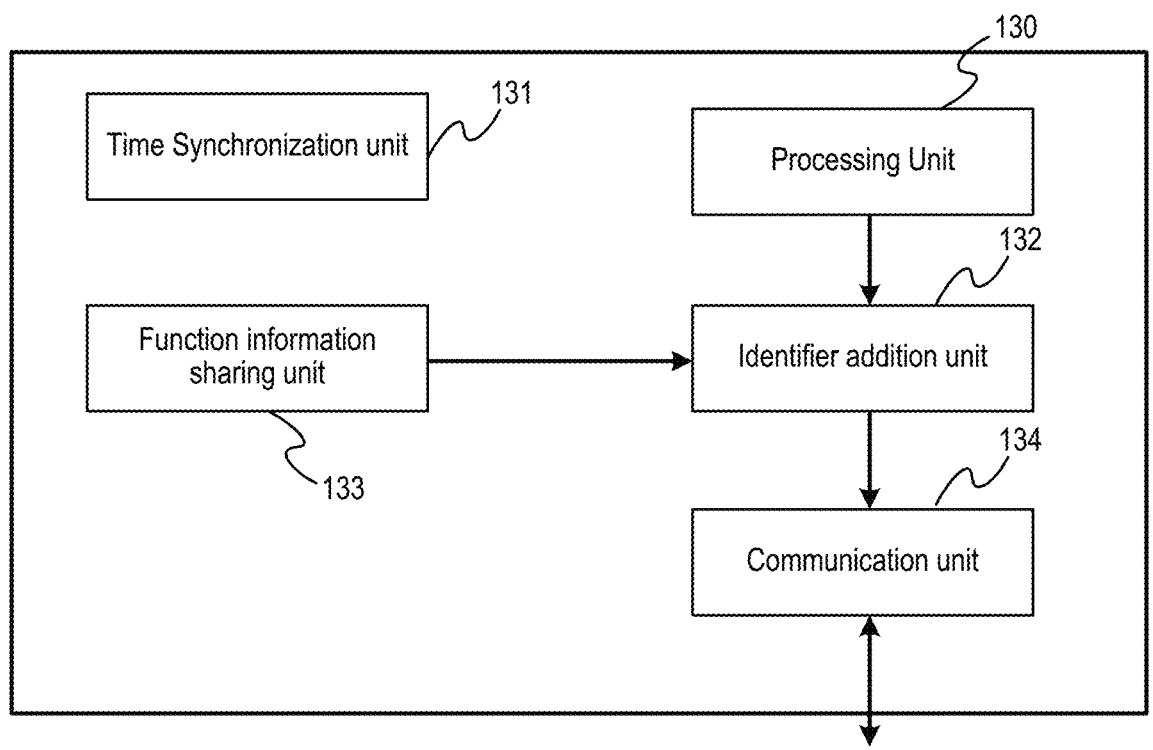
FIG. 5 illustrates the functional structure of the sending function of the control device or I/O control device, in accordance with an example implementation.

FIG. 5 illustrates the functional structure of the sending function of the control device 120 or I/O control device 123, in accordance with an example implementation. Processing Unit 130 executes processing such as control operation and information processing. In an example of the control operation, the processing unit 130 in the control device 120 calculates the command value required by the I/O control device 123 for controlling the controlled device 124. The processing unit 130 may calculate the command value itself, or the target value for the I/O control device 123 to control the controlled device 124. For the operation of these command values, the processing unit 130 may use information received from the I/O control device 123. This reception information includes the state information of the controlled device 124.

Alternatively, the processing unit 130 in the I/O control device 123 acquires the state information or sensor information of the controlled device 124 via the I/O unit 107. In another example, the processing unit 130 in the I/O control device 123 processes the acquired information.

In addition, another example can involve supporting the timestamp function of transmitting and receiving in the physical layer to accurately synchronize compared to the time synchronization protocol executed by the software processing.

Such processing can include control processing based on control theory such as feedback control theory and feed forward control theory, or control operation based on AI. For example, I (integral) control and state machine based control method, which changes its state depending on the past information and input, can be used. Alternatively, other processing examples can involve asset management such as failure detection or risk state estimation, device management and software version control (software version management and updating, etc.), predictive and preventive maintenance, Condition Based Maintenance (CBM), and statistical calculation by AI or machine learning for remaining life prediction for the I/O control devices 123 and the controlled devices 124.

The processing unit 130 notifies the calculated value such as the command value, the sensor value, and the state value in these processes to the identifier addition unit 132.

Processing of the processing unit 130 may be performed based on the time synchronized by the time synchronization unit 131.

Processing unit 130 is facilitated by CPU 101 or applications running on CPU 101.

The time synchronization unit 131 executes the time synchronization protocol, and synchronizes the time of the control device 120 or the function on the control device 120 to a reference time. The time synchronization protocol to be performed may be IEEE 802. 1AS, IEEE 1588, NTP, SNTP and so on.

The time synchronization unit 131 is facilitated by one or more of CPU 101, applications running on CPU 101, the communication control IC 102, and/or PHY 103.

Identifier addition unit 132 appends identifiers to information such as the command value notified from the processing unit 130.

Identifiers to which identifier addition unit 132 appends includes a function identifier for identifying the processing executed in processing unit 130, and a time identifier for identifying the time associated with the information notified from the processing unit 130 at least.

The function identifier may be an identifier for a function in the I/O control device 123 to be sent the information, an identifier of the software application, or an identifier for the function or the software application of the processing unit 130 that generated the information. Alternatively, the function identifier may be an identifier for some combination of the above.

The function identifier may be a hash value applied cryptographic hash function to the source code and binaries of the program representing the function. An operator may define the function identifiers manually. Alternatively, techniques such as a code signing certificate may be used to define the function identifier. In additional examples, a dedicated server function to perform the assignment of the function identifier may be provided on the system. The server assigns a function identifier dynamically based on a request from functions by using predetermined identification information (e.g., hash value, code signing certificate, etc.). The functions may inquire the availability of the desired function identifier. The functions may continue the query to the server with changing the desired function identifier candidate until the server allows to use it.

The time identifier is the time based on the time synchronized by the time synchronization unit 131. Examples of the time indicated by the time identifier can be the time of generating the command value, scheduled time using the command value in a destination I/O control device 123, and time of obtaining the sensor value.

The synchronized time may be the absolute time or time unified in the control system shown in FIG. 1.

Incidentally, the time identifier may be a sequence number or an index number for situations in which that the start time, period of the control processing, and/or the execution schedule of the function are shared in advance.

Further, the function identifier and the time identifier are the same as the identifiers appended by other identifier addition unit 132 if the target function and time matches.

In addition, the identifier addition unit 132 may append one or more of the identifiers of the control device 120 transmitting the packet, such as media access control (MAC) address and IP address, the identifier of the I/O control device 123 to be sent the packet, the identifier of the communication path through which the packet travels, and the link constituting the communication path (e.g., the path between adjacent network relay devices 121). The link identifier may be represented by the identifier of the network relay devices 121 connected to both ends of the link or the identifier of the communication port of one or both of the network relay devices 121 connected to both ends of the link.

The identifier addition unit 132 is facilitated by one or more of CPU 101, applications running on CPU 101, the communication control IC 102, and the PHY 103.

Function information sharing unit 133 stores information required by the identifier addition unit 132 to append the function identifiers, the time identifier, and other identifiers to information notified from the processing unit 130. To manage the information, function information sharing unit 133 may communicate with other control devices 120, I/O control devices 123, and control communication storage devices 125, and may share the necessary information.

Such information includes identification information of the function to be executed by the control device 120 and the I/O control device 123 in the system shown in FIG. 1, the start time and execution period of the processing in each function. Alternatively, other examples of the information related to software environment that executes the processing unit 130 can involve the software version, generation date, and file size, hardware environment such as version information, computing performance, and storage capacity. Other examples can also include the configuration information of the network 122 such as topology, communication path routing, and communication path redundancy setting, and information related to the controlled device 124 such as execution period of the actuator or sensor.

This information may be stored in a nonvolatile storage medium 105, or the operator may enter the information online. The information may be updated continuously.

Function information sharing unit 133 is facilitated by one or more of CPU 101, applications running on CPU 101, nonvolatile storage medium 105, and communication control IC 102.

Communication unit 134 is connected to the network 122, and communicates according to the communication protocol of the network 122.

The communication unit 134 is connected to the PHY 103 for processing the data or packets that have been notified from the bus 106 when transmitting. The process may include generating a frame from the data, duplication of data or a packet, and adding a predetermined tag, the calculation and addition of abnormal diagnostic data such as cyclic redundancy check (CRC). Examples of appended tags for transmission can involve VLAN tag defined in IEEE802.1Q, HSR tag and PRP tag defined in IEC62439-3, and so on in accordance with the desired implementation. VLAN tag settings include settings for PCP (Priority Code Point), VID (VLAN Identifier).

The communication unit 134 transfers received packets to the processing unit 130, function information sharing unit 133, and/or time synchronization unit 131 upon reception. The communication unit 134 may remove tags from the received packets, and may extract data from the received packets. Further, the communication unit 134 may hold information of the processed packet such as source address and tag for a certain duration. The communication unit 134 is facilitated by one or more of applications running on CPU 101, communication control IC 102, and PHY103.

Figure 6:
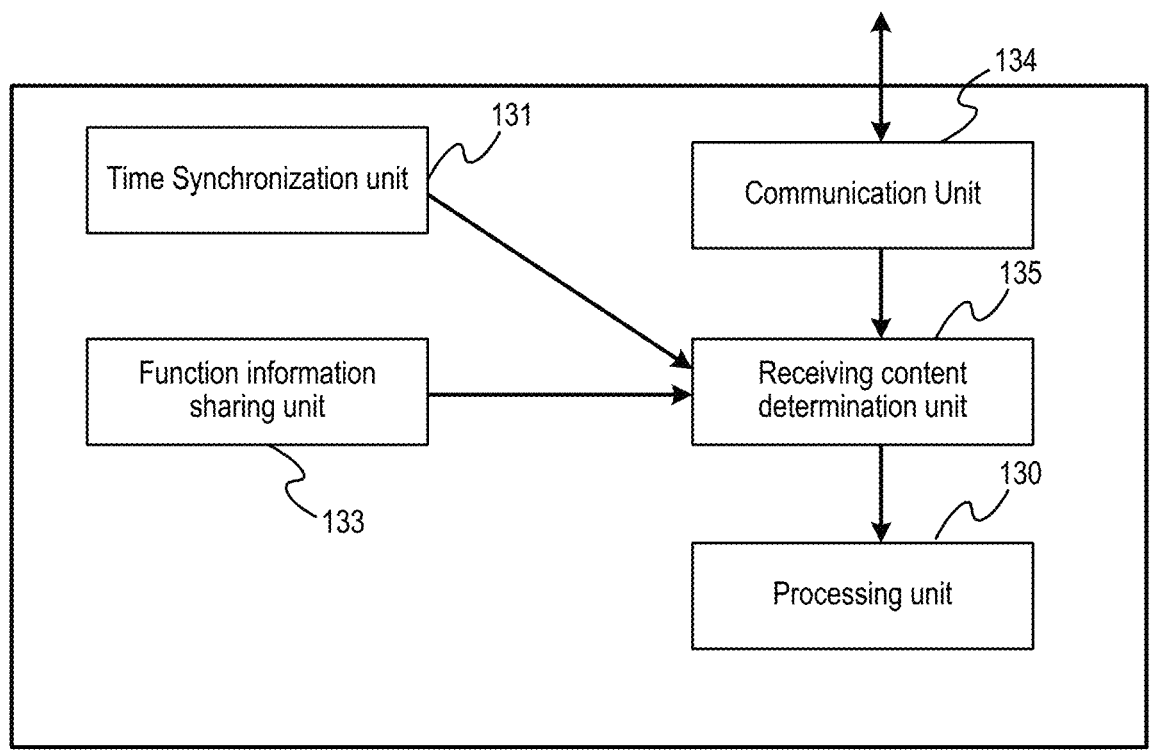
FIG. 6 illustrates the configuration of the receiving function of the control device or I/O control device, in accordance with an example implementation.

FIG. 6 illustrates the configuration of the receiving function of the control device 120 or I/O control device 123, in accordance with an example implementation.

Receiving content determination unit 135 determines receiving content to be process for the packet received from the communication unit 134, based on the function identifier, the time identifier on the packet, and receiving time of the packet.

For example, the receiving content determination unit 135 determines the receiving content by first-come priority or majority decision for multiple incoming packets with the same function identifier and time identifier. For first-come determination, the receiving content determination unit 135 or the communication unit 134 may store the receiving time or receiving order of the received packets. Alternatively, receiving content determination unit 135 may store the number of received packets that has the same content for a majority decision.

Further, the receiving content determination unit 135 determines the receiving content based on the comparison between the receiving time of the received packet and the time specified by the time identifier on the received packet. For example, the receiving content determination unit 135 exclude the received packet from the target packets of the reception determination if the time specified by the time identifier on the packet passed the receiving time of the packet. If the content of the packet is a control command value and the time specified by the time identifier indicates the scheduled time of use of the control command value, the received packet is excluded from the target packets when the receiving time of the packet passed the scheduled time.

A predetermined time may be added to the time specified by the time identifier on the packet when comparing the specified time to the received time of the packet. For example, if the content of the information is a sensor value and the time identifier indicates the acquisition time of the sensor value, so that the time specified by the time identifier had passed at the receiving of the packet at the destination device. Therefore, the time in consideration of the communication delay of the network 122, the processing delay of the control device 120 and the I/O control device 123, and allowable delay from control theory may be added to the time specified by the time identifier on the packet. The received packets are excluded from the target packets of the reception determination when the receiving time of the packet has passed the calculated time.

To determine the necessity and time of such added time, the type of content stored on the packet (e.g., if it is the sensor value, information indicating the need for addition of a predetermined time) and/or the added time may be stored on the packet.

If the number of received packets containing the same function identifier and time identifier is one, then the receiving content determination unit 135 determines to use the information of the received packet.

Alternatively, if the number of received packets containing the same function identifier and time identifier is plurality, the receiving content determination unit 135 may apply statistical calculations to the contents of the target received packet group. For example, if the information is a control command value, such calculated values can include average value, the maximum value, and the minimum value. It is also possible to use a value calculated by filter processing using the past information (e.g., the contents of the packets that has the same function identifier).

Receiving content determination unit 135 can be facilitated by one or more of CPU 101, applications running on CPU 101, and communication control IC 102.

In applications of the example implementations described herein, the configuration of the entire system is designed. A control system generally calculates the control command in a controller based on sensor information, and outputs to an actuator. This is repeated periodically.

Physical and logical location of sensors, controllers, and actuators are designed, and the redundancy level of them are determined when they are connected by network 122. Sensors and actuators have physical contact with the control target, so that the I/O control devices 123 and controlled devices 124 (sensors and actuators) have a physical constraint with respect to location. Since the controller function can be configured as a function or application, it can be configured separately from the physical presence of the control devices 120. For example, the same controller functions may be configured as redundant functions in one control device 120, or the same controller functions may be configured redundant to different control devices 120.

The control devices 120, the I/O control devices 123 are connected by the network 122 to connect these sensors, actuators, and controllers functionally. The network 122 can be redundant for high reliability. Therefore, topology and communication path redundancy of the network 122 are also designed.

Further, a plurality of control functions and AI functions may be present in one site such as DCS and FA, so that a common network 122 may connect a system in which the functions are multiplexed.

The operation procedure based on the communications between the functions in the control system is described.

Figure 7:
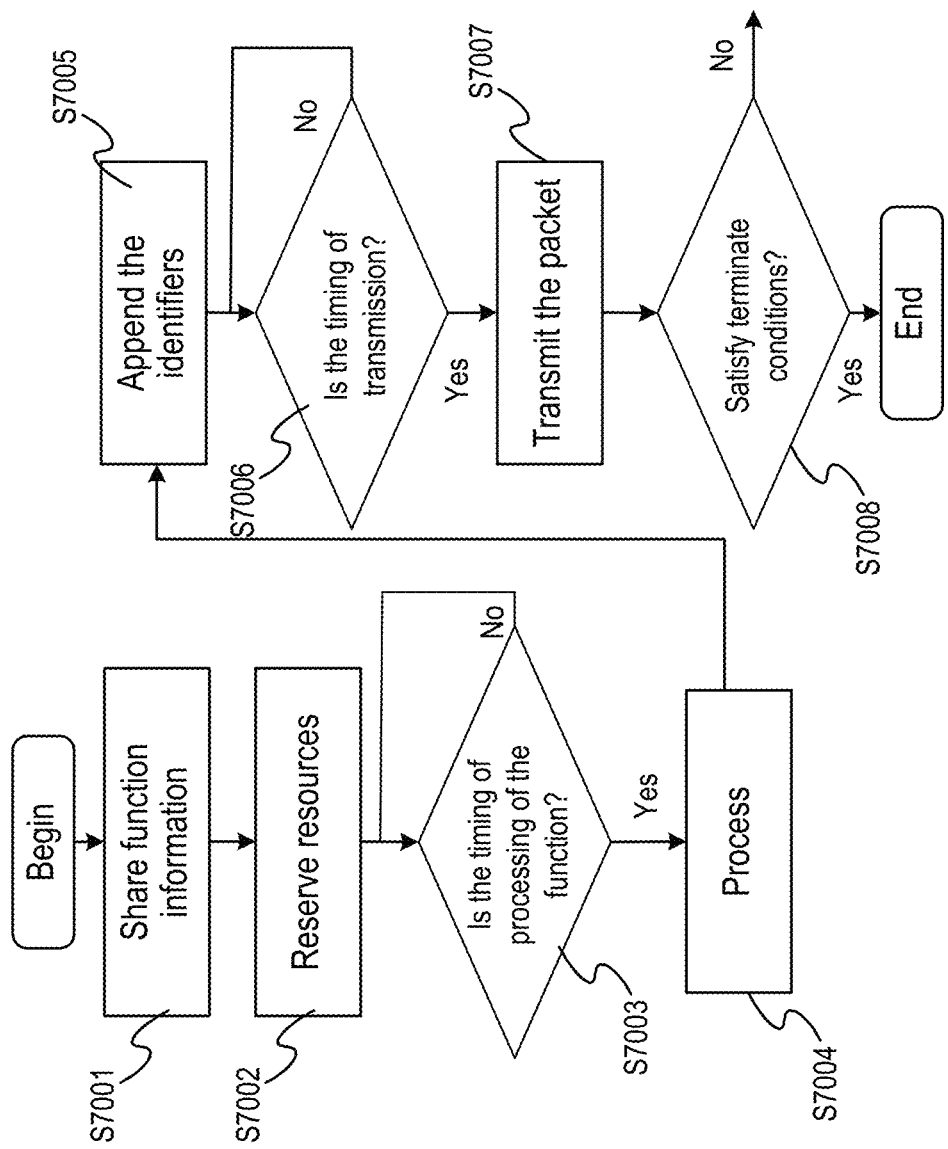
FIG. 7 illustrates the operation procedure of sending functions in the control device and the I/O control device, in accordance with an example implementation.

FIG. 7 illustrates the operation procedure of sending functions in the control device 120 and the I/O control device 123, in accordance with an example implementation.

First, the function information sharing unit 133 acquires information about functions such as control functions and AI functions, and/or shares the information with other function information sharing Unit 133 (S7001). Next, computer resources in the control device 120 and/or I/O control device 123, as well as communication resources in the network relay device 121 and/or network 122 are reserved (S7002). These reservation for computer resources and communication resources are useful for high reliability and to satisfy the constraints such as delay constraints in communication between functions. These reservations may be performed by the operator, the processing unit 130, and/or function information sharing unit 133. Then the function waits until a certain timing related to processing of the function has occurred (S7003).

If the time passed (Yin S7003), the processing unit 130 executes the operation (S7004). Then identifier addition unit 132 appends the identifiers to the information generated in S7004 (S7005). These identifiers include at least the functional identifier and time identifier. Therefore, the identifier addition unit 132 obtains the necessary information from the function information sharing unit 133 and the time based on the synchronized time by time synchronization unit 131, then determines these identifiers. Next, the communication unit 134 waits for the transmission time of the packet (S7006). At the transmission time (Y in S7006), the communication unit 134 transmits the packet (S7007). The transmission time is determined based on the system design and the reservation of the communication resources in network 122.

For example, the time when the packet arrives a network relay device 121 on the communication path of the packet at the timing of a reserved time slot may be set to the transmission time. Then the function determines if termination condition is satisfied (S7008). If the condition is satisfied (Y in S7008), the function finishes the processing. If the condition is not satisfied (N in S7008), the function repeats from S7003. The termination condition may be one or more of an explicit termination instruction by an operator, another control device 120, or another I/O control device 123, a predetermined number of iterations, elapse of a predetermined time, and occurrence of abnormality in the control device 120.

With respect to the reservation of computer resources and communication resources, in S002, the resource may be one or more of the allocation of specific processor (affinity) of multiprocessors or virtual machines in the control device 120 and I/O control device 123, the priority of the function in task scheduling of real-time OS or general OS, and so on. Other examples can include the reservation of specified area in the memory 104, the nonvolatile storage medium 105, and/or communication band and/or timeslot in the bus 106. Alternatively, Quality of Service (QoS) configuration or reservation of communication bandwidth in the network 122 is illustrated. Alternatively, timeslot reservation defined in IEEE 802.1 Qbv in the network 122 when applying TSN is illustrated.

Further, additional examples involve allocation of multiple communication paths when applying the IEEE802.1CB, or HSR and PRP defined in IEC62439-3.

To reserve the resources of the communication path, IEEE802. 1Qat, IEEE802. 1Qcc, or IEEE802. 1Qca may be used as a resource reservation protocol.

Part of resources may be shared for a plurality of functions in the control device 120. That is, if another function already executed the step S7001, the function may skip the step S7001.

Alternatively, the function may not reserve resources, depending on the desired implementation.

Regarding the steps S7001 and S7002, the function may execute the step S7002 first, or may execute both of the steps S7001 and S7002 in parallel, in accordance with the desired implementation.

Alternatively, the function may execute the transmission process of the step S7007 after the step S7005 without waiting for the transmission timing in the step S7006.

Alternatively, the processing time of the step S7003 may be the time the total time of the processing time of the steps S7004 and S7005 before the specified transmission time.

Figure 8:
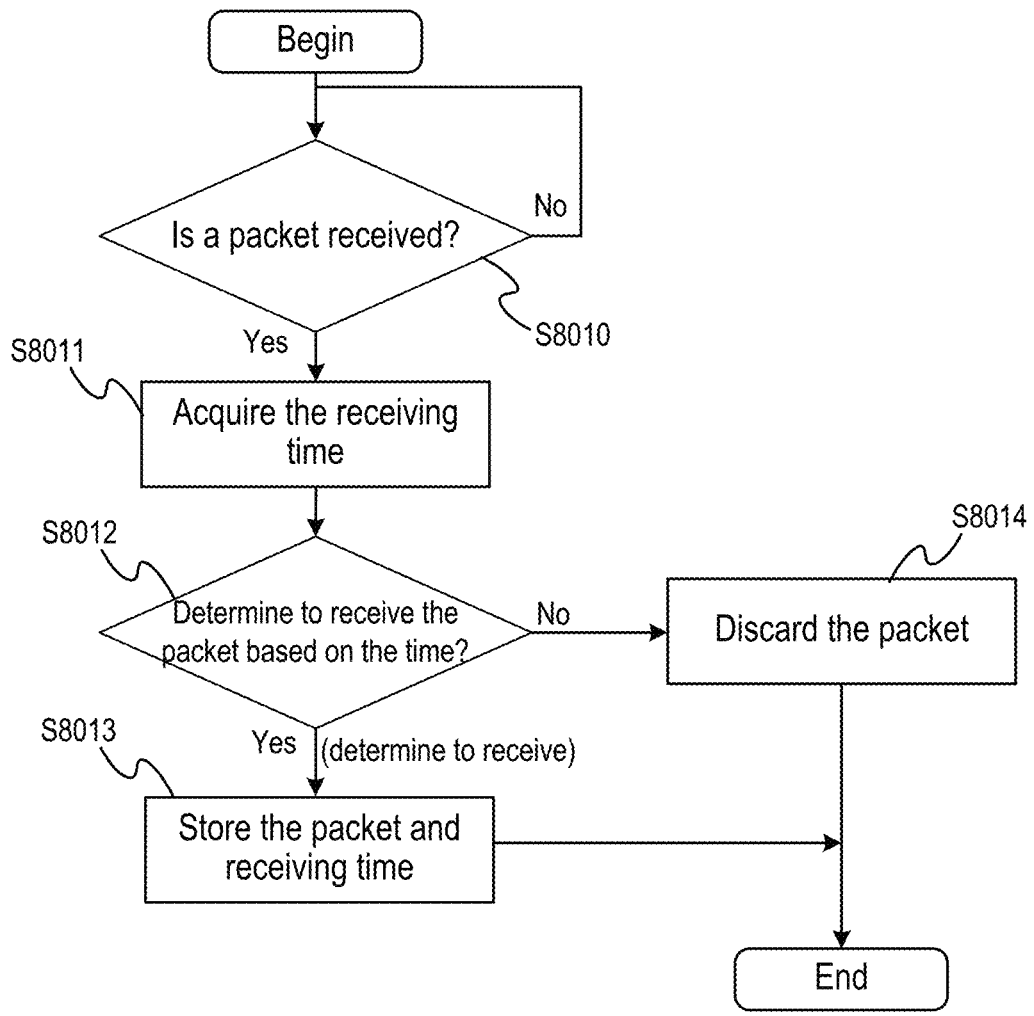
FIG. 8 illustrates the operation procedure of receiving packet functions in the control device and the I/O control device, in accordance with an example implementation.

FIG. 8 illustrates the operation procedure of receiving packet functions in the control device 120 and the I/O control device 123, in accordance with an example implementation.

First, the function waits for the packet to be received (S8010). If the function receives a packet in the communication unit 134 (Y in S8010), the function obtains the receiving time as the synchronized time by using the synchronization time of the time synchronization unit 131 (S8011).

Then the function determines if it receives the packet by comparing the receiving time and the time specified by the time identifier on the received packet (S8012). If the function determines that it is to receive the packet (Y in S8012), the function stores the contents of the received packet (the function identifier, the time identifier, and the contents) with the receiving time (S8013). If the function determines that it is not to receive the packet (N in S8012), it discards the received packet (S8014). The process ends after the step S8013 or S8014.

Figure 9:
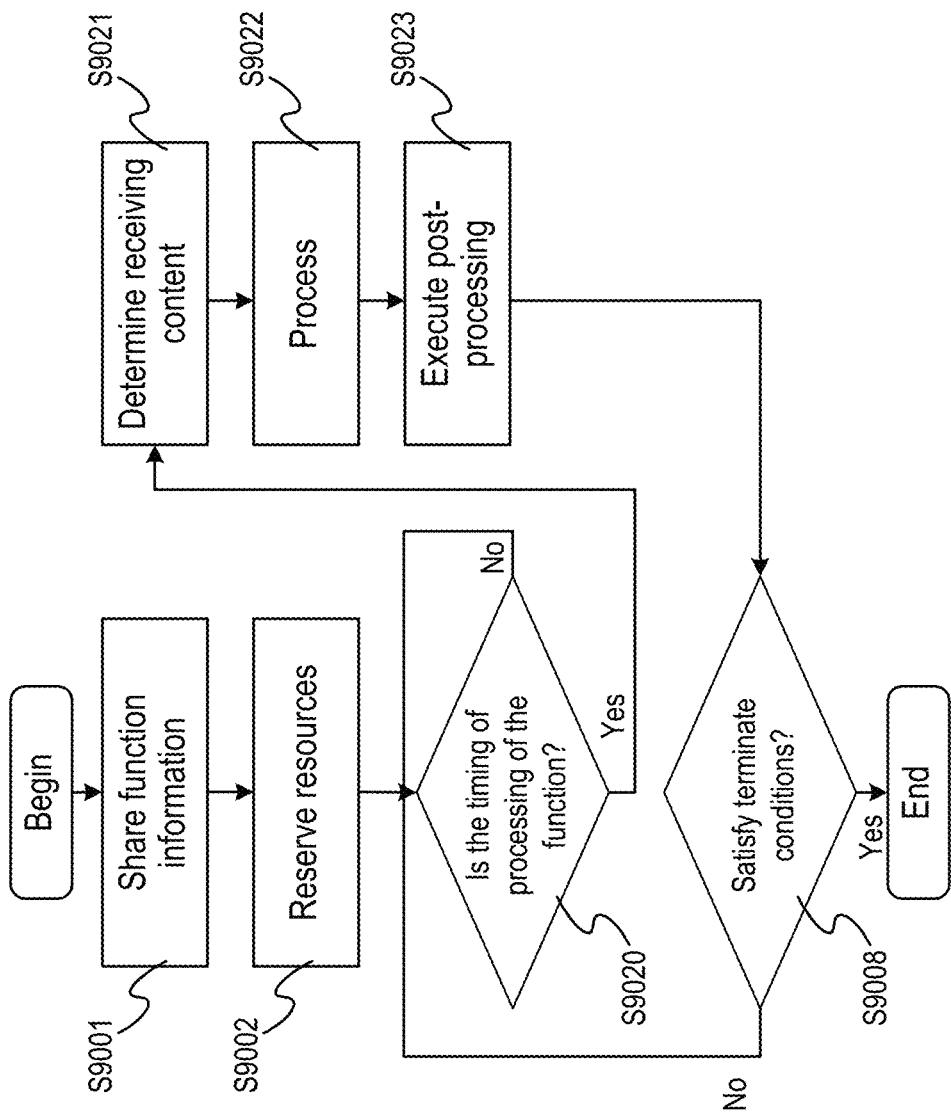
FIG. 9 illustrates the operation procedure of receiving packet and determination process functions in the control device and the I/O control device, in accordance with an example implementation.

FIG. 9 illustrates the operation procedure of receiving packet and determination process functions in the control device 120 and the I/O control device 123, in accordance with an example implementation.

The steps S9001 and S9002 are common with FIG. 7. After the execution of the step S9002, the function waits for the lapse of the specified processing time (S9020). If the specified processing time elapses (Y in S9020), the receiving content determination unit 135 determines the receiving content (S9021).

The determination method targets for the received contents of the packet stored in the step S8013 in FIG. 8. Such a method can involve the first-come packet, majority decision, or application of statistical processing to the contents if there are a plurality of received packets. If there is a single packet, the function selects the packet information.

Next, the processing unit 130 process the received content determined (S9022). Then, the function performs post-processing (S9023). The post-processing may clear the received packet stored in the step S8013 in FIG. 8 or set the timer to clear the stored information after a predetermined period. Then the function determines the termination condition (S9008).

Incidentally, the received packet stored in S8013 in FIG. 8 may be cleared after the processing of the step S9023 in FIG. 9 or may be cleared once the storage capacity of the control device 120 or I/O control device 123 becomes full. In this case, it may be deleted in the order of the oldest stored time.

Incidentally, the steps S9001 and S9002 in FIG. 9 may be executed before the step S8010 in FIG. 8 depending on the desired implementation.

Regarding the steps S9022 and S9023 in FIG. 9, the step S9022 may be executed after the execution of the step S9023, or the steps S9022 and S9023 may be executed in parallel depending on the desired implementation.

Figure 10:
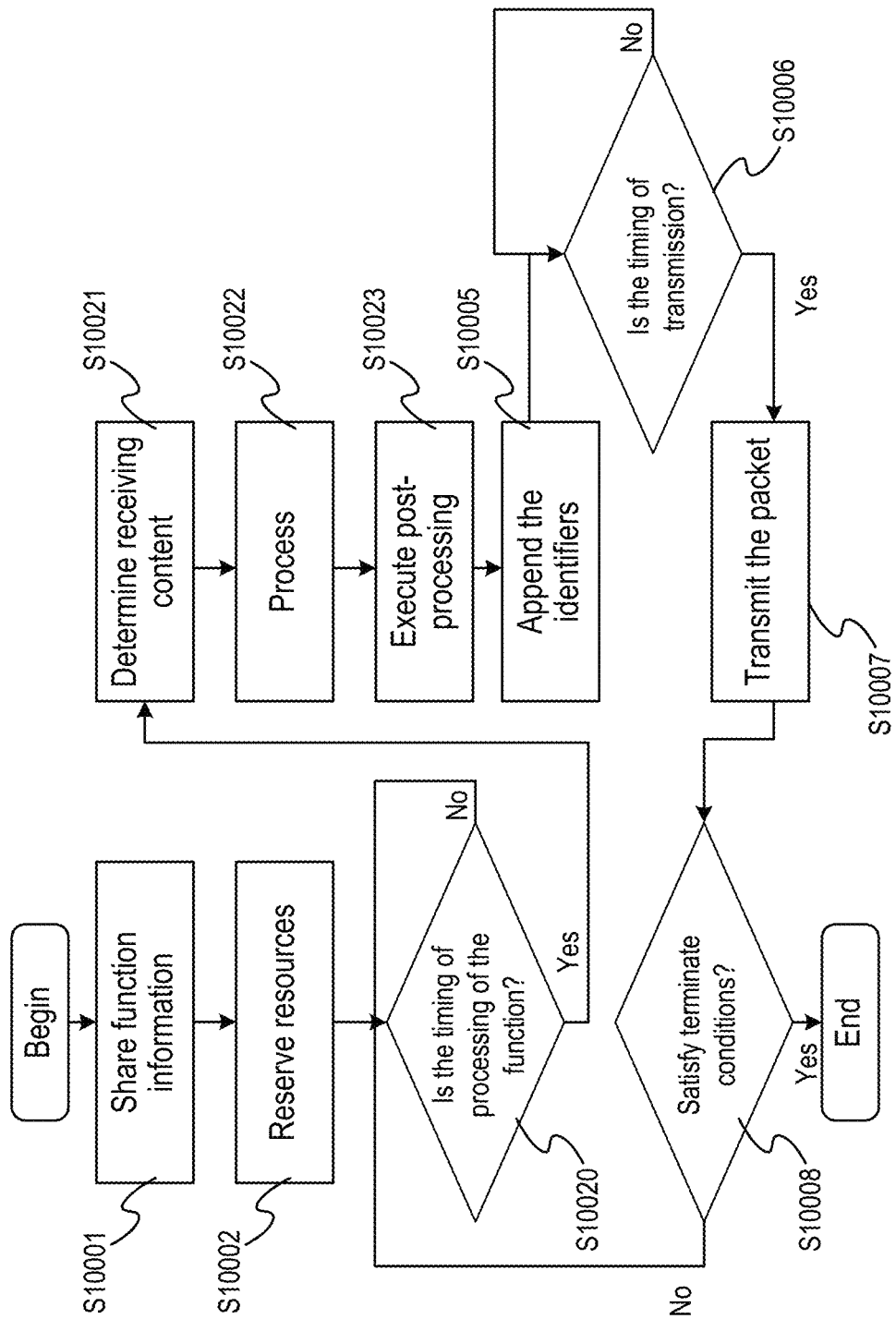
FIG. 10 illustrates the operation procedure of receiving determination process followed by the sending process, in accordance with an example implementation.

FIG. 10 illustrates the operation procedure of receiving determination process followed by the sending process, in accordance with an example implementation. Example of the procedures illustrated in FIGS. 7, 8, 9, and 10 is illustrated by using the structure of FIG. 1.

Herein, the establishment of following three control functions are assumed.
Control function 1:
Sensors: controlled device 124a and I/O control device 123a
Controllers: control device 120a 120b, and 120c
Actuators: controlled device 124b and I/O control device 123b Control function 2:
Sensors: controlled device 124*c* and I/O control device 123*c*
Controllers: control device 120*a*, 120*b*, and 120*c*
Actuators: controlled device 124*c* and I/O control device 123*c*
Control function 3:
Sensors: controlled device 124*d* and I/O control device 123*d*
Controllers: control device 120*b* and 120*c*
Actuators: controlled device 124*d* and I/O control device 123*d*

The controllers have triple redundancy in control functions 1 and 2, and double redundancy in control function 3.

In an example, controlled device 124*c* can be a robot, and controlled device 124*d* can be a mobile object such as an automated guided vehicle (AGV) which can double as a sensor and an actuator.

Incidentally, a sensor and actuator are assumed in each control function in FIG. 1, but they may be redundant, depending on the desired implementation. It may be a homogeneous one (e.g., a plurality of same encoder sensors such as position detection are installed), or it may be a heterogeneous one. In an example of the latter, a camera attached to the operating area in addition to the sensor attached the object itself can be an example of the sensor of the AGV or robot. When the same sensor or actuator is used redundantly in a homogeneous manner, the sensor function and actuator function may be executed in each of a plurality of the I/O control devices 123, so that those functions are redundant as the controller functions 140.

Figure 11:
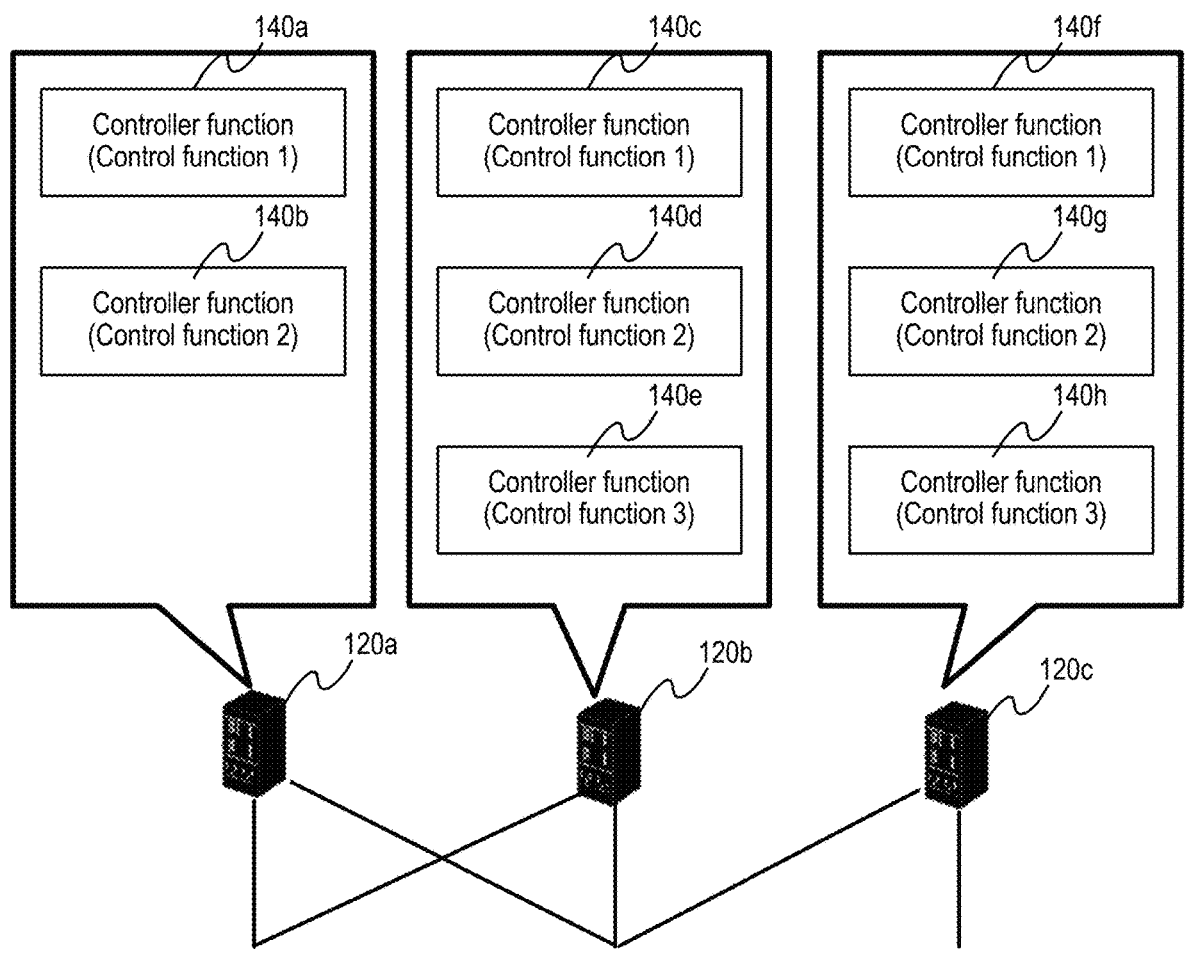
FIG. 11 illustrates the configuration of the controller function of the control devices, in accordance with an example implementation.

FIG. 11 illustrates the configuration of the controller function of the control devices 120*a*, 120*b*, and 120*c*, in accordance with an example implementation. In control device 120*a*, the controller functions of control function 1 and 2 are executed. Such a configuration is implemented using a software program, virtual machine, or software container and other technologies in accordance with the desired implementation. Similarly, the controller functions of the control function 1, 2, and 3 are executed in the control device 120*b* and 120*c*.

The controller function of the same control function is basically the same software program. Alternatively, different algorithms may be used to achieve the same purpose.

The information of the function is defined and shared in step S7001, S9001, and S10001 as illustrated in FIGS. 7, 9, and 10.

FIG. 12 illustrates an example definition of a function identifier, in accordance with an example implementation. As a function identifier, an identifier is assigned for the combination of the sending function and the receiving function. The identifier may be assigned to each of the sending function and receiving function, or only one function (sending function or receiving function).

Incidentally, the function identifier may have a special meaning to a particular value. For example, the function identifier 0 is effective in all functions, for example, can be used in bulk stop or start.

An example of the time identifier is also shown in FIG. 12. The time represented by the time identifier is based on the time synchronized across the system by the time synchronization unit 131. Further, the time is shown in microseconds in FIG. 12, but it may be any other form of expression if it is possible to indicate the same time.

Alternatively, the start time as the sequence number 0, thereafter, the number that is incremented for each cycle may be a time identifier. For example, since the start time is 100,000,000 microseconds and a period is 100 microseconds in the function identifier 1 100,000,000 microseconds is sequence number 0, 100,000,100 microseconds is sequence number 1, 100,000,200 microseconds is the sequence number 2. The start time S of each period associated with the time identifier T can be calculated as follows: $S=S0+P*T$ where S0 is the first start time and P is the period. S can be an end time of a period in accordance with the desired implementation.

Incidentally, the maximum value of the assignable sequence number depends on the number of bits assigned to the time identifier on the packet. For example, if 8 bits are assigned to the time identifier, the maximum value of the sequence number is 255. Since the transmission period is 100 microseconds, the time the sequence number is cycled is 25600 microseconds. It is necessary to define the allocation width of the time identifier so that the time is greater than the allowable delay of the function.

Additional examples of shared information can involve the type of communication content ("type: sensor value" and "type: control" and others in FIG. 12) and allowable delay ("deadline+50 microseconds" in FIG. 11"). The allowable delay is added to the time specified by the time identifier on the packet, then determines whether to receive the packet by comparing the current time in the step S8012 in FIG. 8. For example, receiving content determination unit 135 receives a packet which its function identifier 1 and its time specified by the time identifier is 100,001,000 microseconds, the packet is determined to be received if the receiving time of the packet is not more than 100,001,050 seconds.

Resources are reserved in the step S7002, S9002, and S10002 in FIGS. 7, 9, and 10.

Task priority, processor allocation, bus, and memory are reserved as the computer resources.

Redundant communication paths are reserved to increase the reliability of the communication as communication resources. Following routes are configured:
Control function 1:
I/O control device 123*a*—controller function 140*a*:
Route 1: network relay device 121*d*—network relay device 121*a*
Route 2: network relay device 121*e*—network relay device 121*b*
I/O control device 123*a*—controller function 140*c*:
Route 1: network relay device 121*d*—network relay device 121*a*
Route 2: network relay device 121*e*—network relay device 121*b*
I/O control device 123*a*—controller function 140*f*:
Route 1: network relay device 121*d*—network relay device 121*a*—network relay device 121*b*
Route 2: network relay device 121*e*—network relay device 121*f*—network relay device 121*c*
controller function 140*a*—I/O control device 123*b*
Route 1: network relay device 121*a*—network relay device 121*d*
Route 2: network relay device 121*b*—network relay device 121*e*
controller function 140*c*—I/O control device 123*b*
Route 1: network relay device 121*a*—network relay device 121*d*
Route 2: network relay device 121*b*—network relay device 121*e*
controller function 140*f*—I/O control device 123*b*
Route 1: network relay device 121*b*—network relay device 121*a*—network relay device 121*d*

Route 2: network relay device 121c—network relay device 121f—network relay device 121e
Control function 2:
I/O control device 123c—controller function 140b:
  Route 1: network relay device 121e—network relay device 121d—network relay device 121a
  Route 2: network relay device 121f—network relay device 121c—network relay device 121b
I/O control device 123c-controller function 140d:
  Route 1: network relay device 121e—network relay device 121d—network relay device 121a
  Route 2: network relay device 121f—network relay device 121c—network relay device 121b
I/O control device 123c-controller function 140g:
  Route 1: network relay device 121e—network relay device 121b
  Route 2: network relay device 121f—network relay device 121c
controller function 140b—I/O control device 123c
  Route 1: network relay device 121a—network relay device 121d—network relay device 121e
  Route 2: network relay device 121b—network relay device 121c—network relay device 121f
controller function 140d—I/O control device 123c
  Route 1: network relay device 121a—network relay device 121d—network relay device 121e
  Route 2: network relay device 121b—network relay device 121c—network relay device 121f
controller function 140g—I/O control device 123c
  Route 1: network relay device 121b—network relay device 121e
  Route 2: network relay device 121c—network relay device 121f
Control function 3:
I/O control device 123d—controller function 140e:
  Route 1: network relay device 121f—network relay device 121e—network relay device 121d—network relay device 121a
  Route 2: network relay device 121f—network relay device 121c—network relay device 121b
I/O control device 123d—controller function 140h:
  Route 1: network relay device 121f—network relay device 121e—network relay device 121b
  Route 2: network relay device 121f—network relay device 121c
controller function 140e—I/O control device 123d
  Route 1: network relay device 121a—network relay device 121d—network relay device 121e—network relay device 121f
  Route 2: network relay device 121b—network relay device 121c—network relay device 121f
controller function 140h—I/O control device 123d
  Route 1: network relay device 121b—network relay device 121e—network relay device 121f
  Route 2: network relay device 121c—network relay device 121f Incidentally, the communication path may be set statically, or it may be configured dynamically.

After designing the communication path, for example, time slots in the cycle on the network relay devices 121 are reserved.

In control function 3, only the I/O control device 123d and access point 126b is the communication path due to physical constraints, the network relay device 121f and the access point 126b are single point of failure.

Figure 13:
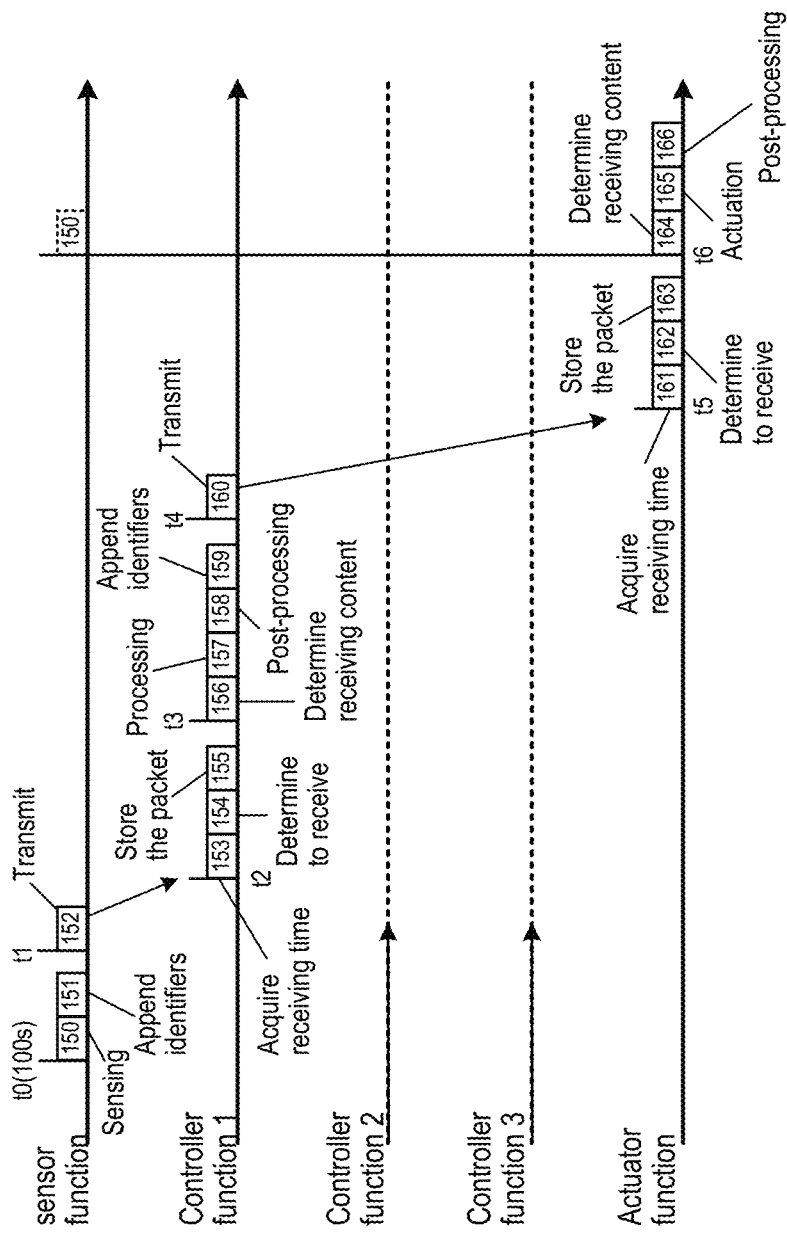
FIG. 13 illustrates the execution of control function 1, in accordance with an example implementation.

FIG. 13 illustrates the execution of control function 1, in accordance with an example implementation. This example shows the execution between a sensor function in the I/O control device 123a, the control functions 140a, 140c, and 104f operated in the control device 120a, 120b and 120c, and an actuator function in the I/O control device 123b.

The sensor function and actuator function are the I/O control device 123a and 123b as devices, but they are a software program as an implementation, so that they are expressed as "function".

The sensor function starts the processing at TIME 100 seconds (100,000,000 microseconds) (t0 in FIG. 13, Y in S7003 in FIG. 7) as shown from the information in FIG. 12, acquires the sensor value from the controlled device 124a as a sensor (150 in FIG. 13, S7004 in FIG. 7). Then the identifier addition unit 132 appends the identifiers to the sensor value (151 in FIG. 13, S7005 in FIG. 7), and waits for the transmission time. If the transmission time passes (T1 in FIG. 13, Y in S7006 in FIG. 7), the communication unit 134 transmits the packet (152 in FIG. 13, S7007 in FIG. 7). Since the controller function 140 is redundant, it transmits the packet to the controller functions 140a, 140c, and 140f.

FIGS. 14(a) to 14(c) illustrate example packets, in accordance with an example implementation. Specifically, FIG. 14(a) illustrates a packet format, FIG. 14(b) illustrates example sensor information at a particular time, and FIG. 14(c) illustrates an example control command. The function identifier is 1, the time identifier is 100,000,000 which refers to a sensor acquisition time, and the sensor value is stored as the data.

The controller function 140a in the controller functions 140 is focused as a description. The controller function 140a receives the sensor value from the sensor function (t2 in FIG. 13, Y in S8010 in FIG. 8), then acquires the receiving time t2 (153 in FIG. 13, S8011 in FIG. 8). Then, the controller function 140a adds the allowable delay 50 microseconds to 100,000,000 as the time identifier, and gets the sum of 100,000,050. The controller function 140a compares the 100,000,050 and the 100,000,020 of the packet receiving time t2. Since the packet receiving time is not elapsed time specified the time identifier, the controller function 140a determines to receive the packet (154 in FIG. 13, Y in S8012 in FIG. 8). Then, the controller function 140a stores the contents of the received packet with the receiving time t2 (155 in FIG. 13, S8013 in FIG. 8).

Then, if a predetermined time t3 (100,000,050) comes (t3 in FIG. 13, Y in S10020 in FIG. 10), the receiving content determination unit 135 determines the received content based on the contents of the received packet (156 in FIG. 13, S10021 in FIG. 10). If there is no abnormality in the components of the system, the controller function 140a should receive the packet with the function identifier 1, the time identifier 100,000,000 from the sensor function, the processing unit 130 uses the sensor value of the packet.

Next, the processing unit 130 calculates a control command value based on the received content determined (157 in FIG. 13, S10022 in FIG. 10). Then, the controller function 140a performs post-processing such as clearing the received packet that was stored (158 in FIG. 13, S10023 in FIG. 10), append the identifiers to the calculated control command value (159 in FIG. 13, S10005 in FIG. 10), and transmits the packet after the transmission scheduled time (t4 in FIG. 13, Y in S10006 in FIG. 10) (160 in FIG. 13, S10007 in FIG. 10).

FIG. 14(c) shows an example of the packet format at the time after the above processing. In the packet, the function identifier is 2, the time identifier is 100,000,100 as the scheduled time of use of the control command value, and the control command value is stored as the data.

When the actuator function receives the control command value from the controller function 140 (t5 in FIG. 13, Y in S8010 in FIG. 8), acquires the receiving time t5 (161 in FIG. 13, S8011 in FIG. 8). Then, the actuator function compares 100,000,100 specified by the time identifier and 100,000,080 as the receiving packet time t5. Since the packet receiving time is not elapsed time specified by the time identifier, the actuator function determines to receive the packet (162 in FIG. 13, Y in S8012 in FIG. 8). Then, the actuator function stores the contents of the received packet with the receiving time t5 (163 in FIG. 13, S8013 in FIG. 8).

Figure 20A:
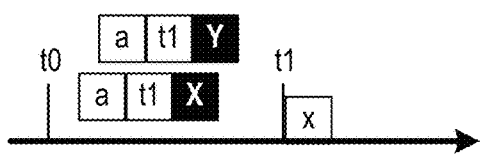
FIGS. 20($a$) to 20($d$) illustrate example packet processing, in accordance with an example implementation.
Figure 20B:
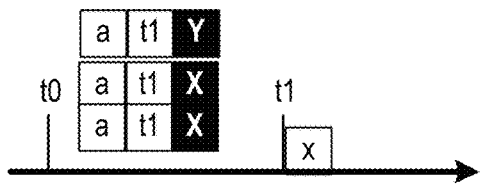
Figure 20C:
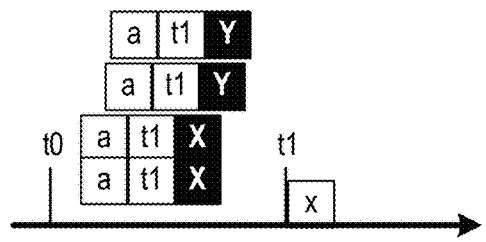

Then, when the predetermined time t6 (100,000,100) comes (t6 in FIG. 13, Yin S9020 in FIG. 9), the receiving content determination unit 135 determines the received content based on the contents of the received packets (164 in FIG. 13, S9021 of FIG. 9). If there is no abnormality in the components of the system, the actuator function should receive a total of six packets from controller functions 140a, 140c including redundant routes. Each packet has the function identifier 2 and the time identifier 100,000,100, and the actuator function should store the six packets. The receiving content determination unit 135 may take any of the control command value of the earliest received packet (in a first come manner as illustrated in FIG. 20(a)), a majority decision in the six control command value (FIG. 20(b)), the control command value of the first-come packet when there is the same number of values in majority decision (FIG. 20(c)), the control command value of a packet selected based on the priority determined by the combination of computer resources and communication resources, or the statistical values such as the average value for the six control command values for these packets.

Figure 20D:
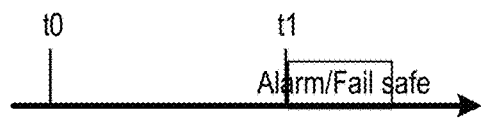

Incidentally, the control command value should be basically matched, however if there is abnormality in the control devices 120, and the network 122 and other, the value may be different. In particular, if no packets are received within a period associated with the time identifier, notifying operators, other control devices 120, and the I/O control device 123, to take a failsafe process, or to request retransmission to the control device 120 (FIG. 20(d)).

Which decision method to use is determined in consideration of the difficulty of the implementation, the processing time, and the situation of target control functions. For example, when the high speed of the processing time is required, the first-come priority method which is expected to be fast may be used. When the certainty of calculation is needed, the majority decision may be used. When the difference in the calculated value would be expected from the difference in the algorithm of the controller functions 140 (e.g., quantization error, etc.), statistical calculation may be used.

The processing unit 130 calculates the output value to the controlled device 124 based on the received content determined (165 in FIG. 13, S9022 in FIG. 9). Then, the actuator function performs post-processing such as clearing the received packet that has been stored (166 in FIG. 13, S9023 in FIG. 9).

Thereafter, these processes are periodically repeated.

Incidentally, the processing start time of the controller function t3 is determined in consideration of communication delay between the I/O control device 123a and control devices 120, processing time of a series of processing in the controller function 140, communication delay between the control devices 120 and the I/O control device 123b, requirements of control function (control function 1 in this case) and so on.

Depending on the desired implementation, the time identifier may be expressed without using the start time and period. FIGS. 15(a) to 15(c) illustrate scheduling aspects, in accordance with an example implementation. Specifically, FIG. 15(a) is an example of a schedule table. If a transmission function and receiving function share the table in advance, then they can obtain the time with the identifier from the table.

Alternatively, the functions can share the first identifier and time only, then may store the next time of the identifier and the time in the packet. FIG. 15(b) shows a packet format, and FIG. 15(c) shows an example of such an implementation. The next time identifier 180 represents the next time identifier, the next time 181 represents the corresponding time. Based on the schedule of FIG. 15(a), assuming that the time identifier 0 and the time 100,000,000 are shared, since the next target time is the time identifier 1 and the time is 100,001,000, these parameters are stored in 182, 183 in FIG. 15(c).

Incidentally, the next time 181, 183 may not be an absolute time, may be the difference time from the last time.

By knowing the next time in advance, it is possible to perform a rapid recovery process if the time passes without receiving the packets.

In another example implementation, the case of using the existing communication path redundancy protocols is described herein.

FIGS. 16(a) to 16(c) illustrate the packet format of HSR, PRP, in accordance with an example implementation. These are corresponding to the format defined in IEC 62439-3 and IEEE 802.1CB. The tags defined by these standards contain sequence number 190. Therefore, associating the time shown in FIG. 12 or FIG. 15(a) and sequence numbers in advance (for example, associating the first time and sequence number 0), and the function identifier 191 is defined on the packet, it is possible to implement the present invention by using the existing communication redundancy protocol.

By taking such an implementation, it aims to redundancy of functions using standard products, and can thereby be highly reliable.

Incidentally, the function identifier and time identifier may be in different forms of expression for each packet or function. For example, a value of 100 seconds as a time identifier is a value of 100,000,000 if it is expressed in microseconds, and a value of 100,000 if it is expressed in milliseconds.

The receiving content determination unit 135 may determine the equality of the function by comparing these values normalized. In order to normalize the representation format, information indicating the representation format may be stored on the packet or the information may be shared in advance by the function information sharing unit 133.

In the determination of the received content in the receiving content determination unit 135, the receiving content determination unit 135 may define the priority based on the predetermined information and may determine the receiving content based on the priority. The priority may be determined based on the control device 120 which generates the packet, a particular network relay device 121 by which the packet passes, and a particular path or link. As such examples, the specific control device 120 may use a highly reliable method such as trust computing, and a particular path or link may be guaranteed of low communication noise. Alternatively, the priority may be changed depending on the number of hops of the network relay devices 121 or cable length of the path. This is because the failure is considered to be less likely when the number of hops is small, or the cable length is short. Alternatively, the priority may be determined based on the dynamic information. For example, the priority may be determined based on the history in the determination of past receiving contents. For example, a high priority may be assigned the packet from the control device 120 that has been employed the most in the past. This may be applied to the network relay device 121, path, and link as the number of selections similarly. It may be based on the received history, not selection.

The priority may be the combination of the above-mentioned determination method. As an example, the sum of the value for each item of priority multiplied by a predetermined weighting coefficient is ordered in a large order. The index of the order may be the priority.

The determination based on the priority may be employed in the case of the same number of received content in majority decision.

When the receiving content determination unit 135 applies the statistical method to the information of a plurality of received packets, the above-mentioned priority may be considered. For example, the weighting factor based on the identification of the control device 120 is multiplied to a value of the control device 120.

The controller function 140, the sensor function, and the actuator function may transmit a plurality of the same packet. They may transmit continuously when transmitting a packet, or they may transmit in response to request from the receiving side. By doing so, the effect of temporary failure in the control device 120, I/O control device 123, network relay device 121, and network 122 can be avoided.

Alternatively, the controller function 140 may forward the calculated control command value by itself to other controller functions 140. For example, controller function 140a may transfer the control command value to the controller function 140b and 140c in FIG. 11.

The controller function 140b and 140c can determine the abnormality by comparing the control command value of its own calculation and the received control command value. When another function forwards a command, the function can determine the presence of an abnormality. When two or more functions forwards commands, the function can guess which controller function 140 may have an abnormality.

If an abnormality is determined, it is possible to take measures such as to warn operators by a predetermined method and/or failure recovery. The notification to the operator can involve e-mail, information disclosure by web server, and physical indications such as a pilot lamp. This is not only the controller function 140; such applications can also be applied when the sensor function and actuator function have redundancy.

Further, the actuator function as a receiving function may forward the received content determined in the step S9021 in FIG. 9 for a plurality of control command values received from the controller function 140 to the controller function 140 involved. The controller functions 140 can determine the abnormality based on the information.

By such implementations, it is possible to estimate the presence of an abnormality and abnormal points. The availability can be improved by notification to operators and failure recovery, so that the system can be highly reliable.

Receiving function (for example, the actuator function that receives the control command value) may notify the operator when the function determines that a failure has occurred itself if the plurality of control command values are not the same, portions of packets are not received, or if there is a packet that could not be received in time.

Further, to estimate the failure location, the identifier addition unit 132 may append one or more of the identifiers of the control device 120 to be transmitted from, the identifier of the I/O control device 123 to be the destination, the identifier of the communication path where the packet travel through, and the identifier of the link constituting the communication path to the packet in the step S7005 of FIG. 7.

Alternatively, the control device 120 and I/O control device 123 that receives the packet may store the function identifier, the time identifier, and other identifiers, then may send the information to the control communication storage device 125 or other devices (not shown) automatically or in response to the request. For example, packets that have elapsed a predetermined time may be stored without discarding in the steps S8012 and S8014 in FIG. 8, then the packets may be notified to operators.

Failure location can be estimated based on the information. For example, if the I/O control device 123b receives the control command value only from the controller function 140a (the control device 120a) and the controller function 140f (the control device 120c), a failure in the control device 120b can be determined to occur. Similarly, a failure of the network relay device 121 and the link can be determined by using the information across the functions.

Operators can immediately determine a failure location and recover the failure by seeing an abnormality of the specific control device 120, I/O control device 123, network relay device 121, path, and link, so that the availability of the system can be improved and the system can be highly reliable.

Alternatively, in the case of packets that have elapsed a predetermined time in the steps S8012 and S8014 in FIG. 8, it is possible to determine whether the communication delay is increased by a problem of the system design based on the information of the packets. For example, if the frequency of the step S8014 in FIG. 8 is applied often for packets through a specific path, it is exemplified to change the communication path of the packets. By reviewing the system design in this way, the target control system can be changed to satisfy the time constraints, so that it is possible to improve the performance and reliability of the control system.

Incidentally, information about the function may be changed dynamically. In that case, the function information sharing unit 133 may share the updated information (the function identifier, the time identifier, period, and others) and the timing of the update is enabled with other control devices 120, I/O control devices 123, sensor functions, controller functions 140 and actuator functions.

The function identifier may reflect either a sending function or receiving function, or both. The combination may be changed dynamically. For example, when the combination of an identifier of a sending function and an identifier of a receiving function defines a function identifier, the function identifier may change depending on only the identifier of the sending function.

Sending functions and receiving functions share the information about the functions in advance by the function information sharing unit 133, so that the functions can determine that some abnormality has occurred if they receive no packets from the sending functions until the time has lapsed in the step S9021 and S10021 of FIGS. 9 and 10, respectively.

The recovery to the error in such a case includes to request retransmission to the sending function from the receiving function, to notify the abnormality to operators and other devices, and to perform a predetermined fail-safe process. Safety stop is exemplified as a fail-safe process.

In addition, if the controlled device 124 is a mobile object and is connected to the network 122 via wireless communication, the recovery includes moving of the mobile object to connect to another access point 126.

Alternatively, the recovery may be to output the same command value as the previous, or to output the default command value.

Further, a mobile object that connects to the network 122 via wireless communication (the controlled device 124c and 124d in FIG. 1) may move, so that the access point 126 of the connection to the network 122 may be changed. Therefore, a communication route to a control device 120 may change. In preparation for such a case, reservation of a plurality of communication paths in advance is one example implementation for connecting with the moving object. For example, reservation of time slots on the network relay device 124e, 124d, and 124a as a path to the control device 120b is exemplified in the case that the controlled device 124d in FIG. 1 newly connected to the access point 124d by its moving.

In addition, the redundant functions on the control device 120 may move. The controller functions 140 for the controlled devices 124d and 123d are deployed on the control devices 120b and 120c as the controller functions 140e and 140h respectively. However, when the access point 126 connected to the controlled device 124d change to the access point 126a, for example, the controller function 140 may be deployed on the control device 120a. This procedure is based on FIG. 18. Whether the execution of the movement of such controller function 140 may be determined based on if the delay is shortened, if redundant communication path is reduced, or the information such as the calculation load of the control device 120.

Further, in order to realize such implementations, an I/O control device 123 may know if the connected control device 124 is a mobile object, and the function information sharing unit 133 may share that the control device 124 is a mobile object with other function information sharing units 133.

The control communication storage device 125 records packets on the network 122. The information about the packets can be used for the redundancy of the functions, or for statistical analysis such as artificial intelligence (AI) to improve the operation of the control system.

Figure 17:
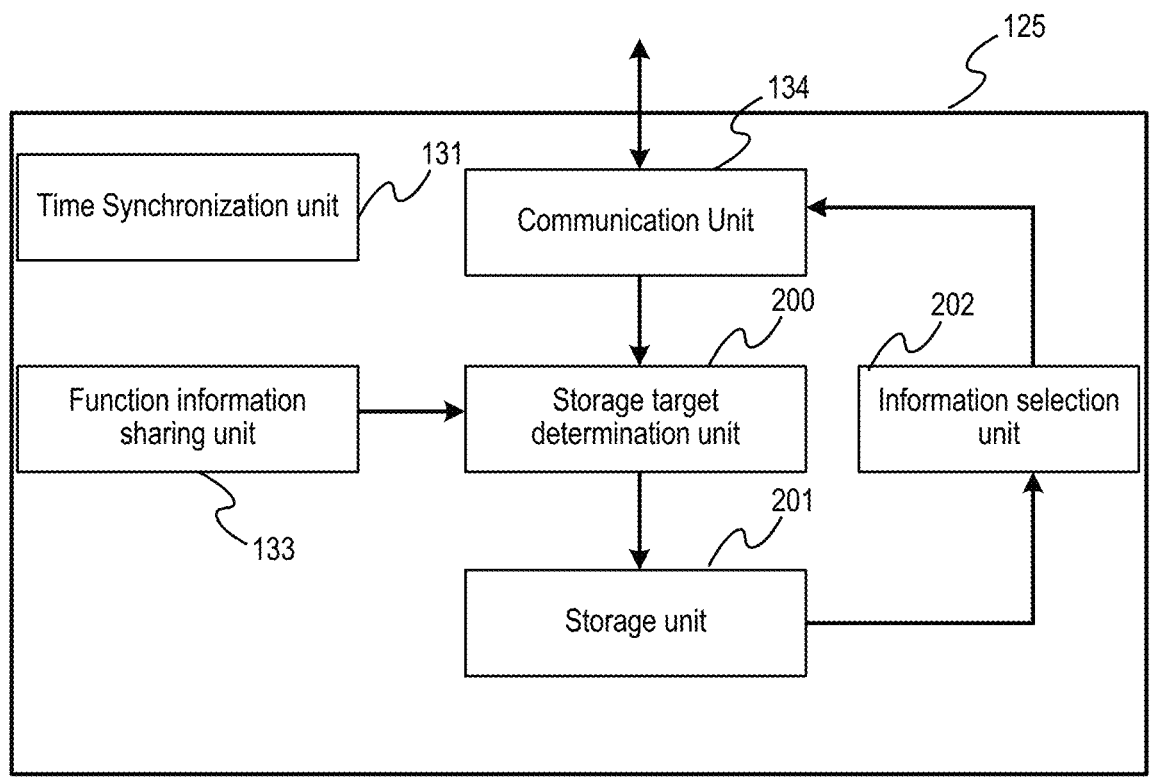
FIG. 17 illustrates the functional structure of the control communication storage device, in accordance with an example implementation.

FIG. 17 illustrates the functional structure of the control communication storage device 125, in accordance with an example implementation. Storage target determination unit 200 determines whether the acquired packet is a storage target. Storage target determination unit 200 is facilitated by one or more of CPU 101, applications running on CPU 101, and the communication control IC 102. Storage unit 201 stores the packet which is a storage target. Storage unit 201 is facilitated by one or more of memory 104 and nonvolatile storage medium 105. Information selection unit 202 provides the information stored in storage unit 201 in response to requests from the outside to the requestor through communication unit 134. If necessary, it may process the information. Examples can involve to provide only the requested information (for example, the time identifier and data content), and to be a set format of a plurality of information, and to calculate statistical values (for example, the number of information matching the specified conditions). Information selection unit 202 is facilitated by one or more of CPU 101, applications running on CPU 101, and the communication control IC 102.

The control communication storage device 125 needs to be able to receive the necessary packets. Therefore, the sensor function, controller function 140, actuator function, or control device 120, I/O control device 123 may transfer the required packets to the control communication storage device 125. At this time, the received time of the packet may be appended to the packet in the receiving function. Alternatively, communication between the functions is configured as a multicast or broadcast for the control communication storage device 125 to receive the packets. Alternatively, port mirroring feature on the network relay device 121 may be used to allow the control communication storage device 125 to receive the required packets. FIG. 1 illustrates the only communication path to the control communication storage device 125, however two or more paths may be used depending on the desired implementation. In addition, a plurality of the network relay devices 121, control devices 120, I/O control devices 123 may connect to the control communication storage device 125.

Packet for which the control communication storage device 125 is stored may be a packet having a predetermined function identifier, or a packet to be communicated during a predetermined period. Alternatively, a packet that the time specified by the time identifier is in a predetermined period may be the target packet. Alternatively, a packet that the value of the data matches a predetermined condition or statistical values such as the amount of change or the accumulated amount of data matches a predetermined condition may be the target packet. Alternatively, a packet that the source or destination is a specific control device 120 or I/O control device 123 may be the target packet. Alternatively, a packet that travel through a specific network relay device 121 or link may be the target packet.

To retrieve the desired data from the control communication storage device 125, a database language such as structured query language (SQL) may be defined. Request for obtaining the desired data from the control communication storage device 125 includes the same specification as the packet to be stored. For example, a function identifier, a time identifier, and a period designation are exemplified.

If control communication storage device 125 has the appropriate information for the retrieval request, control communication storage device 125 may return the information in a packet shown in FIG. 14, or may add type information (if it is a function identifier, or a time identifier, or other identifiers, or a receiving time, or the data content). Alternatively, control communication storage device 125 may return a plurality of information collectively.

If there is no information corresponding to the request, control communication storage device 125 may reply a code that indicates that it does not hold the requested information to a requestor. The code should be defined in advance. Alternatively, as more detailed information, if control communication storage device 125 is not set to store the target information, control communication storage device 125 may respond as such. For example, there can be cases in which the packet of the control device 120 is not the storage target.

If the amount of information about the packet to be stored increases and thereby exceeds the storage capacity in the control communication storage device 125, or if the remaining capacity is below a predetermined threshold, operators can be notified in accordance with the desired implementation. Alternatively, the control communication storage device 125 may obtain capacity through removal of old data in age order.

Alternatively, the control communication storage device 125 may convert into the format of the context data, rather than in the form of individual packets. This is based on that the function changes state by the initial state and the input in the past. As the context data, the data in memory that the program is deployed at run time, or a set of variables when the state is defined as a set of values is illustrated. These context data may be obtained by executing virtually a virtual machine or program representing the function of the target in the control communication storage device 125 and processing the actual input.

To hold the context data in the control communication storage device 125, one example implementation is to obtain the initial state of the context of the target function. When the control communication storage device 125 converts a set of packets into the context data and stores them, the function identifier of the corresponding function and the time of the converted context may be stored.

Incidentally, in the case where the context changes in a factor other than the packet to be communicated on the network 122, the control communication storage device 125 may also store the factors. For example, the local input means on the control device 120 and the I/O control device 123 such as DIP switches and push buttons, keyboard mouse are exemplified. To achieve this, the control device 120 and the I/O control device 123 may acquire, store and provide the factor events.

Alternatively, the control device 120 and the I/O control device 123 itself may provide the means to acquire, store, and provide the context at a specified time.

Incidentally, the controller function 140, sensor function, and actuator function may store the information sent by itself as a sending function or the information received as a receiving function to obtain the same effect as the control communication storage device 125.

Therefore, the functions may not clear received packets as a post-processing of S9023 and S10023 in FIGS. 9 and 10, and the function may store them.

The information to be stored may be the function identifier, the time identifier, data content of the packet, receiving time of the packet, and other identifiers.

Such functions are illustrated to be facilitated by applications running on CPU 101, or the information of the packet may be stored when the communication control IC 102 processes the packet.

Figure 18:
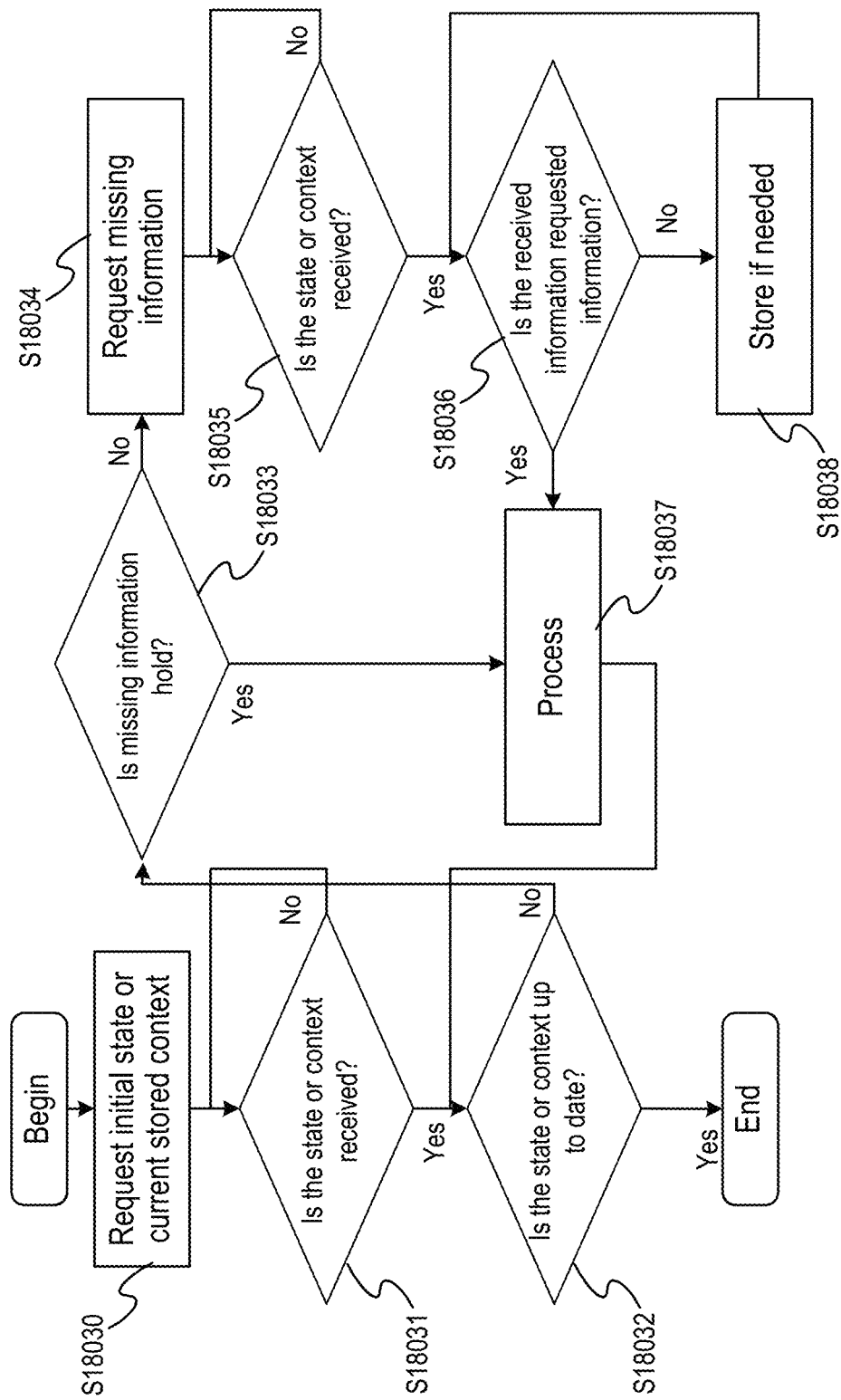
FIG. 18 illustrates the operation procedure for matching the state when adding a redundant function during operation of the system, in accordance with an example implementation.

FIG. 18 illustrates the operation procedure for matching the state when adding a redundant function during operation of the system, in accordance with an example implementation.

This is the case where the degree of redundancy is increased to increase the reliability of a certain function during system operation, or the case where some of received packets are lost.

First, a function requests the initial state or current stored context data to the control communication storage device 125 (S18030). The added device sets the network 122 to be able to communicate with the control communication storage device 125. Incidentally, instead of acquiring from the control communication storage device 125, the function may acquire the initial state or context data using a storage medium.

Next, the function waits for the retrieval of the initial state or context data (S18031). If the function obtains the initial state or context data (Yin S18031), the function determines whether the obtained state is the latest context data by comparing the time of the obtained context data and current time (S18032). If it is not up to date (N in S18032), the function determines whether the function holds the information that is missing for the current time (S18033). If the missing information is not held (N in S18033), the function sends a request to the control communication storage device 125 for providing missing information (S18034). Then, the function waits for the information to be retrieved (S18035). If the function obtains the information (Y in S18035), the function determines whether the information is the requested missing information (S18036). If the information is the requested missing information (Yin S18036), the function calculates using that information, and updates the context (S18037).

In the step S18036, if the acquired information is not requested information (N in S18036), since the information may be the latest information that is communicating on the network 122, the function stores the information if necessary (S18038).

Considering this S18038, if the missing information is held in the step S18033 (Y in S18033), the function performs the step S18037.

After processing the step S18037, the step goes back to the step S18032.

In the step S18032, if the state is up to date (Y in S18032), the function terminates the process.

Figure 19:
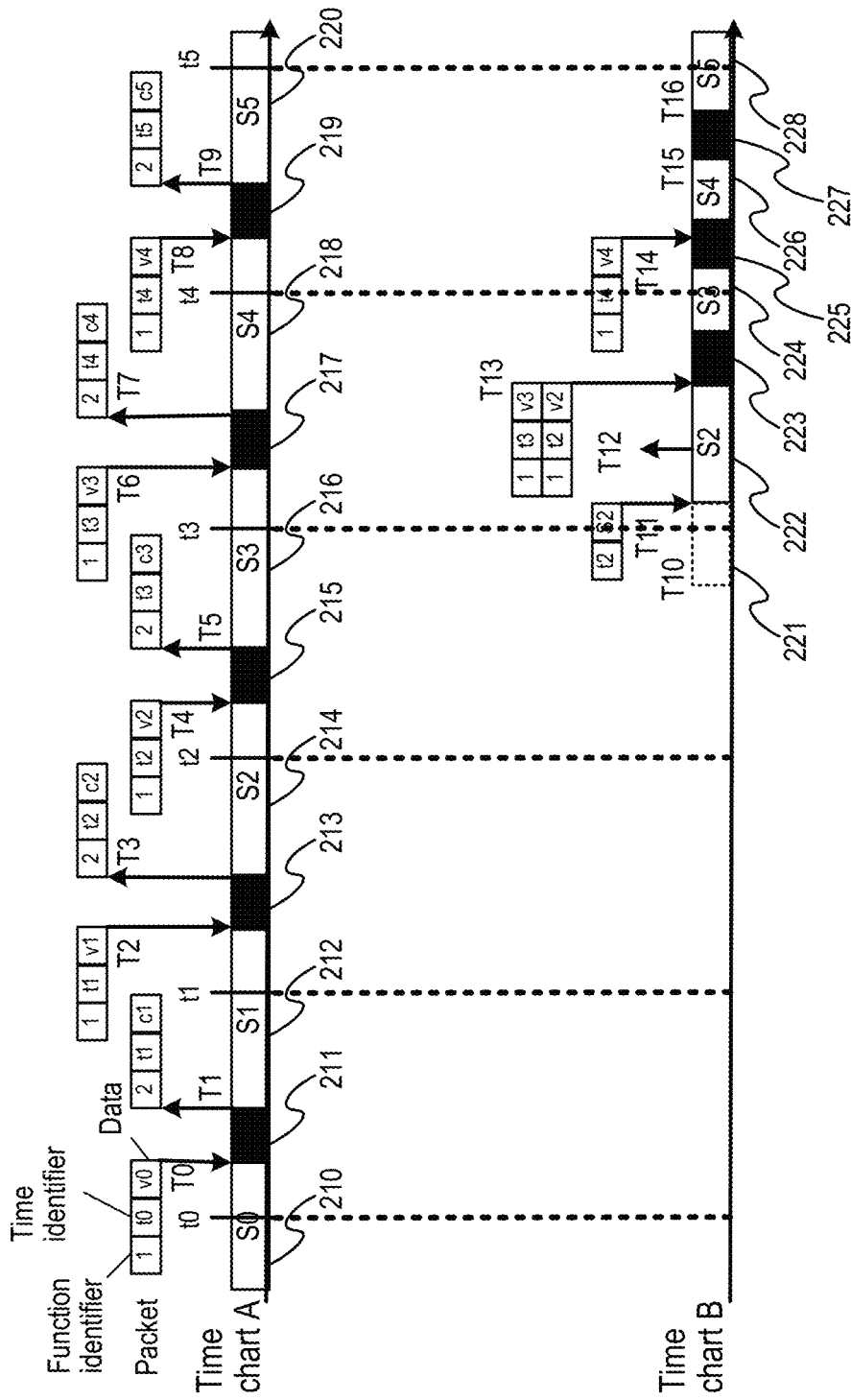
FIG. 19 illustrates an example of a state recovery, in accordance with an example implementation.

An example of procedure shown in FIG. 18 is shown in FIG. 19. FIG. 19 illustrates an example of a state recovery, in accordance with an example implementation.

The state recovery for the controller function is described as an example. Time chart A is the operation of the main system to be redundant. The char starts from the initial state S0 (210), and the function receives the sensor information of t0 at T1, then executes the control operation (211), and changes to the state S1 with outputting the command value at T1. The function repeats this process thereafter.

Time chart B is the operation of the redundant system. Now, assume that the state recovery process started in T10. First, the function requests the latest context data stored to the control communication storage device 125 (corresponding to the step S18030 in FIG. 18).

In T11, the function obtains the state S2 from the control communication storage device 125 (corresponding to the step S18031 in FIG. 18). Since T11 has elapsed T3 and the state S2 is a state in T2 of the time chart A, S2 is found to be not the latest state (corresponding to N in S18032 in FIG. 18).

Further, since the function does not hold sensor information t2 and t3 as missing information (corresponding to the N in S18033 in FIG. 18), the function requests the missing sensor information to the control communication storage device 125 at T12 (corresponding to the step S18034 in FIG. 18).

The request at this time may include the functional identifier 1 and the time identifier information t2 and t3, or the function identifier 1 and the time identifier t2 or later. Assume that the function obtains the function identifier is 1 and the time identifiers are t2 and t3 at T13 (corresponding to Yin S18035 in FIG. 18).

Since the acquired information is the requested information (corresponding to Y in S18036 in FIG. 18), the function sequentially executes the control operation (223 and 225 in FIG. 19) (corresponding to S18037 in FIG. 18). In T14, the function receives the sensor information of the function identifier 1 and the time identifier t4 and stores it.

This is equivalent to N in S18036 and S18038 in FIG. 18, but the receiving of the packet may be executed asynchronously with the procedure of FIG. 18. Thus, the process of N of S18036 and S18038 in FIG. 18 may be executed in parallel to the procedure of FIG. 18.

Since T15 when the control operation was terminated has elapsed t4, it is understood that the state S4 is not the latest (corresponding to N in S18032 in FIG. 18), and since the function holds the sensor information of t4 that is necessary (Yin S18033 in FIG. 18), the function executes the control operation again (Yin S18037 in FIG. 18), the state become S5 at T16. Here, the current time T16 is later than t4 and before t5, it can be seen that it became the latest state (Y in S18032 in FIG. 18). By the above process, redundant system can synchronize its state with the state of the main system and operates in the same manner as the main system after the recovery process.

These processes can add redundant systems without stopping the system. Further, since redundant systems can be added during operation, the redundancy level can be changed dynamically, so that operators can change the reliability according to the system requirement such as cost.

Incidentally, a control communication storage device 125 is exemplified as the request destination of the context and information in FIGS. 18 and 19, it may be another control device 120 or I/O control device 123 that has the same function as the control communication storage device 125.

Incidentally, the redundant system shown in the time chart B may output the old command value until the function synchronized to the latest state while performing the state recovery process. Since this is determined to be old on the receiving side by using the time identifier on the packet, it is expected that there should be no problem on the execution of the function. However, since there is a possibility of erroneous abnormality determination by receiving the old commands, one example implementation can involve a process wherein the function does not output until the function synchronizes to the latest state. Specifically, since the state S3 and S4 in 223 and 225 in FIG. 19 can be determined to be old with respect to current period t4, thereby the output can be limited.

Such an output limit mechanism can be facilitated by one or more of CPU 101, applications running on CPU 101, communication control IC 102, and communication unit 134.

Depending on the desired implementation, a monitoring device may be added (not shown in FIG. 1). The device monitors the presence of failure of the entire system, the location of the failure (the control device 120, I/O control device 123, network relay device 121, the link constituting the network 122), and the current effective redundancy (unit of functions, unit of devices) by observing the packet that communicates with function information sharing unit 133, control communication storage device 125, or network 122.

When the information is mismatched or a function receives packet over the specified time in the receiving function, the monitoring device may determine a failure has occurred.

The monitoring device may notify to operators and other devices when the failure occurs or the redundancy of any function, device, and the path becomes a predetermined number (for example, 1).

In advance, the requirements of redundancy for the function is defined, and if the requirement is not satisfied, the monitoring device may deploy redundant functions using the procedure in FIG. 18. Alternatively, an operator may manually deploy redundant function.

To achieve a physical or logical separate domain, a control device 120, I/O control device 123 or another device located at the domain boundary may change the functional identifier, the time identifiers, or other identifiers.

By the above example implementation, a plurality of control functions are multiplexed into one control device 120 or I/O control device 123, and redundant functions are instantiated on different control devices 120 and I/O control devices 123. Therefore, it is possible to achieve high reliability by continuous redundancy in real-time control system with time constraints by determining the receiving contents based on the function identifier and the time identifier. The above implementation is also effective in the System of Systems in which a plurality of control systems are multiplexed. Alternatively, even when redundant systems are subsequently added, since it is possible to obtain the missing information based on the function identifier and the time identifier, the redundant systems can be added flexibly to the real-time control system. Since a redundant system can be added without stopping the system, it is possible to improve the reliability without lowering availability. Alternatively, the presence of failure and failure location of the system can be determined based on the shared information and the identifiers on the packet communicated on the network, so that an operator can add redundant system automatically or manually when the system does not satisfy the redundancy requirement. Therefore it is possible to improve the reliability without lowering the availability of the system.

As described herein, example implementations involve systems and methods to manage data packets from one or more time synchronized apparatuses through a network scheme, which can include receiving the data packets from the one or more time synchronized apparatuses time synchronized, each of the data packets having a time identifier; selecting ones of the data packets received within a certain time period based on a current time; selecting packets having a same time identifier and function identifier from the selected ones of the data packets; and processing the selected packets having the same time identifier and the function identifier to provide output to a controller application of the one or more time synchronized apparatuses.

As described herein, example implementations involve systems and methods wherein the processing the selected packets having the same time identifier and the function identifier to provide the output to the controller application of the one or more time synchronized apparatuses includes determining control information for execution by the controller application from a first received packet of the selected packets having the same time identifier and the function identifier.

As described herein, example implementations involve systems and method wherein the processing the selected packets having the same time identifier and the function identifier to provide the output to the controller application of the one or more time synchronized apparatuses comprises determining control information for execution by the controller application from a majority decision process applied on the selected packets having the same time identifier and the function identifier.

As described herein, there are systems and methods wherein the processing the selected packets having the same time identifier and the function identifier to provide the output to the controller application of the one or more time synchronized apparatuses comprises determining control information for execution by the controller application from a statistical calculation of the control information of the each of the selected packets having the same time identifier and the function identifier. Such a statistical calculation can involve an average value or other values in accordance with the desired implementation, such as, but not limited to, the average value, the maximum value, the minimum value, a value derived from filter processing using historical information, and so on.

As described herein, example implementations involve systems and methods including, further comprising, for a function associated with the function identifier of the controller application indicating either that the selected packets having the same time identifier and the function identifier do not match, reception of the selected packets after a time period associated with the time identifier, or that a time period associated with the time identifier has lapsed, conducting one or more of requesting retransmission of the data packets; providing a notification of non-receipt of the data packets; or executing safety processing. As described herein, such conditions to trigger the abnormality detection and recovery process is reception of the packet after a time period associated with the time identifier. These conditions look similar to the lapsing of the time period associated with the time identifier, but the timing to trigger the recoveries differs. For example, one is at the timing of the end of the period, but the other is at the timing of reception of the packet. Thus, they can involve different conditions.

As described herein, the time identifier can be a sequence value associated with a time in accordance with an example implementation.

As described herein, example implementations involve systems and methods including storing the received data packets in a storage device; and outputting stored packet information of the received packets in response to a request.

As described herein, example implementations involve systems and methods wherein a first function of the controller application of the one or more time synchronized apparatuses associated with the function identifier synchronizes to a second function of the one or more time synchronized apparatuses that transmitted the data packets through one or more of a context of the second function at a specified time; the stored packet information provided by the storage device in response to the request; or the received data packets.

As described herein, example implementations can involve systems and methods wherein the first function is configured not to output to another function until synchronization to the context of the second function has occurred. For example, in an example involving three control functions (control function A, control function B, and actuator function), let control function A be the recovery target, control function B be the recovering control function A, and an application be established between control functions A, B and actuator function. In such an example, control function A can be the second function, or the recovery target, control function B can be the first function, and the actuator function can be the another function.

As described herein, example implementations can involve systems and methods including executing redundant functions on one more devices, the redundant functions being configured to send the data packets having the same time identifier and function identifier.

As described herein, example implementations can involve systems and methods wherein a function of the controller application is configured to transmit the selected packets having the same time identifier and the function identifier to one of the redundant functions of the one or more time synchronized apparatuses that is redundant to the function of the controller application.

As described herein, example implementations can involve systems and methods that include, for a change of a communication point of a function of the controller application in a network; changing one or more of an apparatus of the one or more time synchronized apparatuses that operates the function of the controller application or a communication path to a destination function.

As described herein, example implementations can involve systems and methods wherein functions of the one or more time synchronized apparatuses are connected via a network with redundant communication paths.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method to manage data packets from time synchronized apparatuses through a network scheme, the method comprising:
    receiving, by a processor, the data packets from the time synchronized apparatuses via redundant communication paths, each of the data packets having a time identifier which is with a time synchronized by and across the time synchronized apparatuses;
    selecting, by the processor, ones of the data packets received within a certain time period based on a current time associated with time synchronized by the time synchronized apparatuses;
    selecting, by the processor, packets having a same time identifier and a same function identifier from the selected ones of the data packets received in real-time to ensure reliability through redundancy;
    processing, by the processor, the selected packets having the same time identifier and the same function identifier to provide output to a controller application of the time synchronized apparatuses; and
    for a data packet of the data packets being received by the processor at a time past a scheduled time of use as stipulated by associated time identifier, determining occurrence of transmission abnormality associated with the data packet, removing the data packet from selection;
    for the redundant communication path exhibiting multiple instances of communication delays associated with time identifiers of a number of data packets:
    identifying the redundant communication path as being abnormal, and
    modifying the redundant communication path to address abnormality.

2. The method of claim 1, wherein the processing the selected packets having the same time identifier and the function identifier to provide the output to the controller application of the time synchronized apparatuses comprises determining control information for execution by the controller application from a first received packet of the selected packets having the same time identifier and the function identifier.

3. The method of claim 1, wherein the processing the selected packets having the same time identifier and the function identifier to provide the output to the controller application of the time synchronized apparatuses comprises determining control information for execution by the controller application from a majority decision process applied on the selected packets having the same time identifier and the function identifier.

4. The method of claim 1, wherein the processing the selected packets having the same time identifier and the function identifier to provide the output to the controller application of the time synchronized apparatuses comprises determining control information for execution by the controller application from a statistical calculation of the control information of the each of the selected packets having the same time identifier and the function identifier.

5. The method of claim 1, further comprising, for a function associated with the function identifier of the controller application indicating that data in the selected packets having the same time identifier and the function identifier do not match conducting one or more of:
    requesting retransmission of the data packets;
    providing a notification of non-receipt of the data packets; or
    executing safety processing.

6. The method of claim 1, further comprising, when no packet is received within a time period associated with the time identifier, conducting one or more of:
    requesting retransmission of the data packets;
    providing a notification of non-receipt of the data packets; or
    executing safety processing.

7. The method of claim 1, wherein the time identifier is a sequence value associated with a time.

8. The method of claim 1, further comprising:
    storing the received data packets in a storage device; and
    outputting stored packet information of the received packets in response to a request.

9. The method of claim 8, wherein a first function of the controller application of the time synchronized apparatuses associated with the function identifier synchronizes to a second function of the time synchronized apparatuses that transmitted the data packets through one or more of:
    a context of the second function at a specified time;
    the stored packet information provided by the storage device in response to the request; or
    the received data packets.

10. The method of claim 9, wherein the first function is configured not to output to another function until synchronization to the context of the second function has occurred.

11. The method of claim 1, further comprising executing redundant functions on one more devices, the redundant functions being configured to send the data packets having the same time identifier and function identifier.

12. The method of claim 11, wherein a function of the controller application is configured to transmit the selected packets having the same time identifier and the function identifier to one of the redundant functions of the time synchronized apparatuses that is redundant to the function of the controller application.

13. The method of claim 11, further comprising:
    for a change of a communication point of a function of the controller application in a network; changing one or more of an apparatus of the time synchronized apparatuses that operates the function of the controller application or a communication path to a destination function.

14. The method of claim 1, wherein functions of the time synchronized apparatuses are connected via a network with the redundant communication paths.

15. A non-transitory computer readable medium, storing instructions to manage data packets from time synchronized apparatuses through a network scheme, the instructions comprising:

receiving, by a processor, the data packets from the time synchronized apparatuses via redundant communication paths, each of the data packets having a time identifier which is with a time synchronized by and across the time synchronized apparatuses;

selecting, by the processor, ones of the data packets received within a certain time period based on a current time associated with time synchronized by the time synchronized apparatuses;

selecting, by the processor, packets having a same time identifier and a same function identifier from the selected ones of the data packets received in real-time to ensure reliability through redundancy;

processing, by the processor, the selected packets having the same time identifier and the same function identifier to provide output to a controller application of the time synchronized apparatuses; and for a data packet of the data packets being received by the processor at a time past a scheduled time of use as stipulated by associated time identifier, determining occurrence of transmission abnormality associated with the data packet, removing the data packet from selection;

for the redundant communication path exhibiting multiple instances of communication delays associated with time identifiers of a number of data packets:

identifying the redundant communication path as being abnormal, and modifying the redundant communication path to address abnormality.

\* \* \* \* \*